(12) United States Patent
Kleppe et al.

(10) Patent No.: US 10,281,701 B2
(45) Date of Patent: *May 7, 2019

(54) HIGH-RESOLUTION SCANNING MICROSCOPY

(71) Applicant: Carl Zeiss Microscopy GmbH, Jena (DE)

(72) Inventors: Ingo Kleppe, Jena (DE); Yauheni Novikau, Jena (DE); Ralf Netz, Jena (DE); Michael Golles, Jena (DE); Gunther Lorenz, Jena (DE); Christoph Nieten, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 519 days.

This patent is subject to a terminal disclaimer.

(21) Appl. No.: 14/457,856

(22) Filed: Aug. 12, 2014

(65) Prior Publication Data

US 2015/0085099 A1    Mar. 26, 2015

Related U.S. Application Data

(60) Provisional application No. 62/025,676, filed on Jul. 17, 2014.

(30) Foreign Application Priority Data

Aug. 15, 2013    (DE) .................. 10 2013 013 793
Nov. 15, 2013    (DE) .................. 10 2013 019 348

(51) Int. Cl.
*G02B 21/00*    (2006.01)
*G02B 21/02*    (2006.01)
(Continued)

(52) U.S. Cl.
CPC .......... *G02B 21/0072* (2013.01); *G02B 6/06* (2013.01); *G02B 21/008* (2013.01);
(Continued)

(58) Field of Classification Search
CPC .......... G01N 21/6458; G01N 21/6428; G01N 2021/6439; G01N 21/6408;
(Continued)

(56) References Cited

U.S. PATENT DOCUMENTS 6,953,927 B2 * 10/2005 Quake ................... G01Q 30/04
                                                                  250/234
7,247,842 B1 *  7/2007 Quake ................... B82Y 20/00
                                                                  250/234
(Continued)

FOREIGN PATENT DOCUMENTS

DE         1995 148 21 A1     5/2001
DE    10 2006 021 317 B3    10/2007
(Continued)

OTHER PUBLICATIONS

Muller, Claus B., et al., "Image Scanning Microscopy", Physical Review Letters 2010; 104(19):198101-1-198101-4.
(Continued)

*Primary Examiner* — Dave Czekaj
*Assistant Examiner* — Kehinde Abimbola
(74) *Attorney, Agent, or Firm* — Duane Morris LLP

(57) ABSTRACT

Microscope and method for high resolution scanning microscopy of a sample, wherein
the sample is illuminated;
at least one point spot or line spot, which is guided in a scanning manner over the sample, is imaged into a still image; wherein the spot is imaged in a diffraction limited manner into the still image with magnification, and the still image lies still in a plane of detection;

(Continued)

the still image is detected for different scan positions with a spatial resolution, which, taking into consideration the magnification, is at least twice as high as a full width at half maximum of the diffraction-limited still image, so that a diffraction pattern of the still image is detected;

the diffraction pattern of the still image is evaluated for each scan position, and an image of the sample is generated that has a resolution that is increased beyond the diffraction limit, wherein a detector array is provided that has pixels and is larger than the still image; and radiation of the still image from the plane of detection is redistributed in a non-imaging manner among the pixels of the detector array;

wherein at least two redistribution elements are provided that are exposed in parallel to the detection light, and wherein the detection light is different at least partially with respect to its spectral composition, and the radiation from the at least two redistribution elements reaches the pixels of a detector array.

27 Claims, 17 Drawing Sheets

(51) Int. Cl.
G02B 21/18 (2006.01)
G02B 21/36 (2006.01)
G02B 6/06 (2006.01)
G02B 26/08 (2006.01)

(52) U.S. Cl.
CPC ....... G02B 21/0064 (2013.01); G02B 21/025 (2013.01); G02B 21/18 (2013.01); G02B 21/361 (2013.01); G02B 26/0816 (2013.01); G02B 26/0825 (2013.01); G02B 26/0833 (2013.01)

(58) Field of Classification Search
CPC ........... G01N 29/2418; G01N 21/1702; G01N 21/59; G01N 21/64; A61L 2430/00; A61K 47/42; A61K 41/0052; A61K 9/06; A61K 2039/53; A61K 2039/55505; A61K 2039/57; A61K 2039/575; A61K 31/16; G02B 21/367; G02B 21/008; G02B 21/02; G02B 3/08; G02B 1/041; G02B 21/0032; G02B 6/06; G02B 21/002; G02B 21/06; G02B 21/00; G02B 21/0024; G02B 21/0036; G02B 1/105; G02B 21/0072; G02B 21/361; G02B 23/26; G02B 27/58; G02B 27/64
See application file for complete search history.

(56) References Cited

U.S. PATENT DOCUMENTS

| | | | | |
|---|---|---|---|---|
| 7,298,461 B2* | 11/2007 | Cremer | ............... | G01N 21/6428 356/73 |
| 7,298,476 B2* | 11/2007 | Tsai | ....................... | B82Y 15/00 250/458.1 |
| 7,964,853 B2* | 6/2011 | Araya | ................... | G02B 21/004 250/458.1 |
| 2004/0254474 A1* | 12/2004 | Seibel | ................... | A61B 5/0062 600/473 |
| 2005/0059681 A1* | 3/2005 | Cremer | ............... | G01N 21/6428 514/260.1 |
| 2006/0012871 A1* | 1/2006 | Funk | ......................... | G01J 3/02 359/385 |
| 2007/0057211 A1 | 3/2007 | Bahlman et al. | | |
| 2007/0096038 A1* | 5/2007 | Tsai | ....................... | B82Y 15/00 250/458.1 |
| 2007/0152144 A1* | 7/2007 | Quake | .................... | B82Y 20/00 250/234 |
| 2009/0028407 A1* | 1/2009 | Seibel | ................... | A61B 1/0008 382/131 |
| 2010/0282981 A1* | 11/2010 | Araya | ................ | G02B 21/0076 250/458.1 |
| 2012/0019821 A1 | 1/2012 | Chen et al. | | |
| 2012/0098949 A1* | 4/2012 | Knebel | ................ | G02B 21/002 348/79 |
| 2012/0099190 A1* | 4/2012 | Knebel | ................ | G02B 21/002 359/385 |
| 2013/0126756 A1* | 5/2013 | Xu | ...................... | G01N 21/6408 250/459.1 |
| 2013/0135715 A1 | 5/2013 | Chen et al. | | |
| 2013/0155499 A1* | 6/2013 | Dixon | .................. | G02B 21/002 359/385 |
| 2013/0342674 A1* | 12/2013 | Dixon | .................... | G02B 21/36 348/79 |

FOREIGN PATENT DOCUMENTS

| | | |
|---|---|---|
| DE | 10 2012 204 128 A1 | 9/2013 |
| EP | 1 157 297 B1 | 11/2002 |
| EP | 2 317 362 A1 | 5/2011 |
| WO | WO 2006/127692 A2 | 11/2006 |
| WO | WO 2013/135487 A1 | 9/2013 |

OTHER PUBLICATIONS

Gong, Wei, et al., "Improved spatial resolution in fluorescence focal modulation microscopy", Optics Letters 2009; 34(22) 3508-3510.
Sheppard, C.J.R.; "Super-resolution in Confocal Imaging"; Optik 80 1988; 2:53-54.
Sarder, Pinaki, et al., "Deconvolution Methods for 3-D Fluorescence Microscopy Images", Signal Processing Magazine 2006; 23(3):32-45.
Translation of the International Preliminary Report on Patentability (Chapter I of the Patent Cooperation Treaty) and Written Opinion of the International Searching Authority.

* cited by examiner

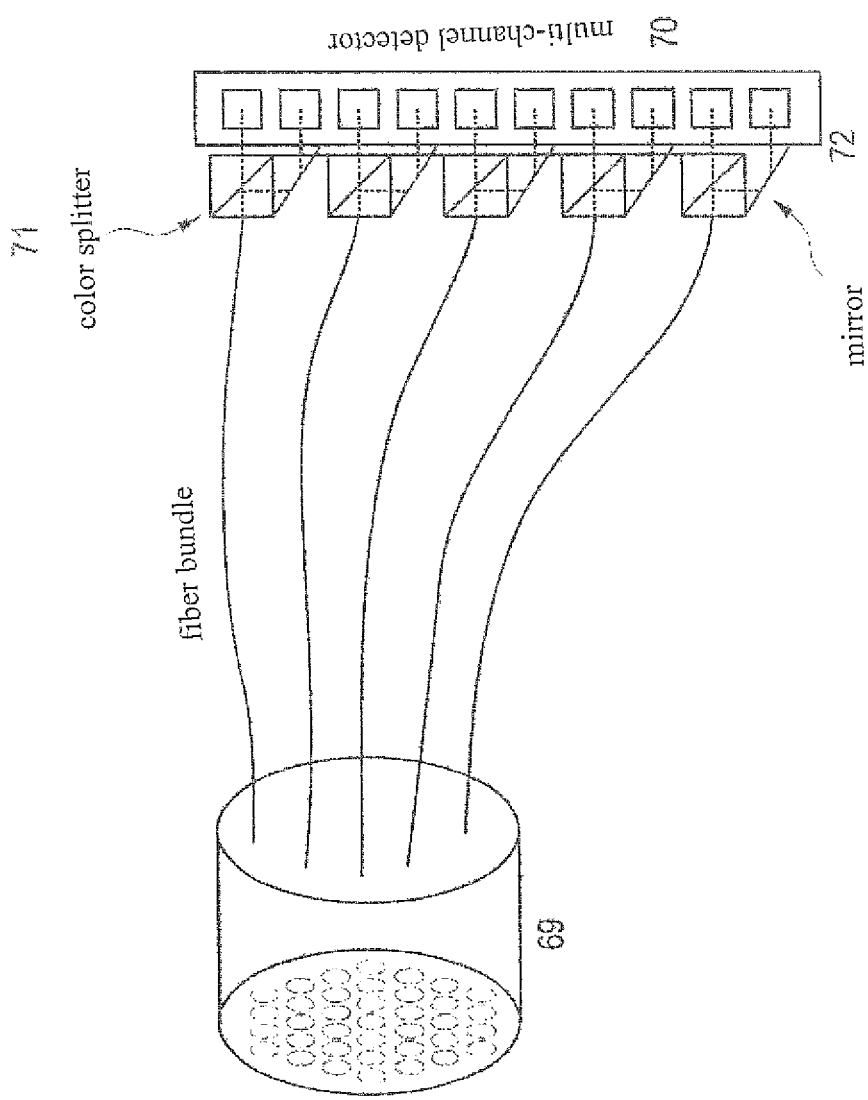

_US 10,281,701 B2_

HIGH-RESOLUTION SCANNING MICROSCOPY

RELATED APPLICATIONS

The present application is a non-provisional application of Provisional Application No. 62/025,676 filed on Jul. 17, 2014 and claims priority benefit of German Application No. DE 10 2013 013 793.4 filed on Aug. 15, 2013 and German Application No. DE 10 2013 019 348.6 filed on Nov. 15, 2013, the contents of each are incorporated by reference in their entirety.

FIELD OF THE INVENTION

The invention relates to a microscope for high resolution scanning microscopy of a sample. The microscope has a lighting device for illuminating the sample; and has imaging device for scanning a point spot or line spot across the sample and for imaging the point spot or line spot into a diffraction-limited, stationary still image with magnification into a plane of detection. A detector device is provided for detecting the still image in the plane of detection for different scan positions with a spatial resolution, which, taking into consideration the magnification, is at least twice as high as a full width at half maximum of the diffraction-limited still image. An evaluation device is provided for evaluating a diffraction pattern of the still image for the scan positions from data of the detector device and for generating an image of the sample. The image has a resolution that is increased beyond the diffraction limit. Furthermore, the invention relates to a method for high resolution scanning microscopy of a sample, in which a sample is illuminated. A point spot or line spot, which is guided in a scanning manner over the sample, is imaged into a still image; wherein the spot is imaged in a diffraction limited manner into the still image with magnification, and the still image lies still in a plane of detection. The still image is detected for different scan positions with a spatial resolution, which, taking into consideration the magnification, is at least twice as high as a full width at half maximum of the diffraction-limited still image, so that a diffraction pattern of the still image is detected; the diffraction pattern of the still image is evaluated for each scan position, and an image of the sample is generated that has a resolution that is increased beyond the diffraction limit.

BACKGROUND OF THE INVENTION

Such a microscope and/or microscopy method are or is known, for example, from the publication of C. Müller and J. Enderlein, Physical Review Letters, 104, 198101 (2010), or the EP 2317362 A1, which also cites additional references to the prior art.

This approach achieves an increase in resolution by imaging a spot in a diffraction limited manner onto a plane of detection. The diffraction-limited image images a point spot as an Airy disk.

This diffraction disk is detected in the plane of detection in such a way that its structure can be resolved. Based on the imaging performance of the microscope, the result is an oversampling on the part of the detector. When imaging a point spot, the form of the Airy disk is resolved. The resolution can be increased by a factor of two beyond this diffraction limit by suitably evaluating the diffraction pattern, which is described in the aforementioned documents; and the disclosure of these documents is hereby incorporated in their entirety.

At the same time, however, it is unavoidable on the detection side that for each point, which is sampled on the sample in this manner, compared to a conventional laser scanning microscope (hereinafter also referred to by the acronym LSM), a still image has to be captured with a plethora of image data. If the structure of the still image of the spot is detected, for example, with 16 pixels, then each spot would have not only 16 times the amount of data, but also a single pixel would have an average of only 1/16 of the radiation intensity that would fall on the detector of an LSM during a conventional pinhole detection. Since the radiation intensity is, of course, not uniformly distributed throughout the structure of the still image, for example, the Airy disk, the radiation intensity at the edge of this structure is actually much less than the mean value of 1/n for n pixels.

Therefore, one is faced with the problem of the detector being able to achieve a high resolution detection of radiation quantities. Conventional CCD (charge coupled diodes) arrays, which are commonly used in microscopy, do not achieve a sufficient signal-to-noise ratio, so that even an extension of the image acquisition time, which by itself would already be a disadvantage in the application, would not help. APD (avalanche photodiode) arrays are also subject to excessive levels of dark noise, so that even an extension of the measuring time would result in an insufficient signal-to-noise ratio. The same applies to CMOS detectors, which are also disadvantageous with respect to the size of the detector element, because the diffraction-limited still image of the spot would fall on too few pixels. PMT (photo multiplier tube) arrays are also associated with similar design space problems. In this case the pixels are also too large. Therefore, the design space problems are based, in particular, on the fact that a high resolution microscope can be realized in terms of the development effort and the distribution of the device, only if integration into existing LSM designs were possible. In such microscopes, however, specific sizes of the still image are specified. A detector, which is larger in terms of area, could be incorporated, only if it were possible to provide, in addition, an optical system that once again significantly expands the image, i.e., by several orders of magnitude. Such an optical system is expensive and complicated in its design, if the objective is to obtain a diffraction-limited pattern without additional aberrations.

Other methods which avoid the above described problems associated with the high resolution detection are also known from the prior art. For example, the EP 1157297 B1 discloses a method that exploits nonlinear processes by means of structured illumination. A structured illumination is moved across the sample in a plurality of rotational and spatial positions and orientations; and the sample is imaged in these different states on a wide field detector, for which the described limitations do not exist.

A method, which also achieves a high resolution (i.e., a resolution of a sample image beyond the diffraction limit) without the described limitations of the detector, is known from the WO 2006127692 and the DE 102006021317. This method, which is known by the acronym PALM [photo activated localization microscopy], uses a marker substance that can be activated by means of an optical activation signal. Only when the marker substance is in the activated state is it possible for the marker substance to be excited with excitation radiation to emit a certain fluorescence radiation; even when exposed to excitation radiation, nonactivated molecules do not emit any fluorescence radiation. Thus, the activation radiation switches the activating substance into a state, in which it can be excited to fluoresce. Therefore, one generally speaks of a switch-over signal. At this point this switch-over signal is applied in such a way that at least a certain proportion of the activated marker molecules are spaced apart from the adjacent marker molecules, which are also activated, in such a way that the activated marker molecules, measured on the basis of the optical resolution of microscopy, are separated or can be subsequently separated. This procedure is referred to as isolating the activated molecules. For these isolated molecules, it is easy to determine the center of their resolution-limited radiation distribution and, based thereon, to computationally determine the location of the molecules with higher accuracy than the optical imaging actually allows. In order to image the entire sample, the PALM method exploits the fact that the probability of a marker molecule being activated by the switch-over signal of a given intensity is the same for all marker molecules. Hence, the intensity of the switch-over signal is applied in such a way that the desired isolation occurs. These process steps are repeated until as many of the marker molecules as possible are included once in a subset that was excited to fluoresce.

SUMMARY OF THE INVENTION

In accordance with the invention, the spot, which is sampled on the sample, is imaged into a plane of detection in such a way that said spot is stationary. Then the radiation from the plane of detection is redistributed in a non-imaging manner and directed onto the detector array. In this case the term "non-imaging" is based on the still image that is present in the plane of detection. It goes without saying that individual surface areas of this still image can still be imaged according to the laws of imaging. However, in this respect it is certainly possible for the imaging optical system to be located between the detector array and the redistribution element. However, the still image, which is present in the plane of detection, is not preserved as such during the redistribution.

The term "diffraction limited" is not to be limited to the diffraction limit according to the Abbe theory, but rather is also to include cases, in which the theoretical maximum is missed by 20% due to concrete shortcomings or limitations. Even then, the still image has a structure that is referred to herein as a diffraction pattern. This diffraction pattern is oversampled.

This principle makes it possible to use a detector array that does not match the still image in its size. The detector array is advantageously larger or smaller than the still image to be detected in at least one expansion. The concept "different geometric design" includes both a different expansion of the detector array as well as an arrangement with a different aspect ratio, based on the height and the width of the expansion of the still image in the plane of detection. In addition, the pixels of the detector array can also be too large for the necessary resolution. At this point it is also permissible for the contour of the pixel arrangement of the detector array to be fundamentally different from the contour of the still image in the plane of detection. Finally, the detector array has, according to the invention, a different size than the still image in the plane of detection. The redistribution in the method or more specifically the redistribution element in the microscope makes it possible to select a detector array without having to take into consideration the dimensional restraints and the pixel size limitations, both of which arise from the still image and its size. In particular, a detector line may be used as the detector array.

The image of the sample is created from a plurality of still images in the conventional LSM manner by sampling the sample with the spot; each of these still images is assigned to a different sampling location, i.e., a different scan position.

The concept, according to the invention, can be carried out simultaneously in a parallelized form for a plurality of spots, a method that is known for laser scanning microscopy. Then a plurality of spots on the sample are sampled in a scanning manner, and the still images of the plurality of spots lie still next to one another in the plane of detection. Thereupon they are redistributed by either a common redistribution element, which is sufficiently large in terms of area, or by a plurality of individual redistribution elements and are then directed to one or more correspondingly larger individual detector arrays.

The following description focuses, by way of example, on sampling with a single point spot. However, this approach is not to be construed as a restriction, and the elucidated features and principles also apply mutatis mutandis to the parallel sampling of a plurality of point spots as well as to the use of a line spot. The latter is, of course, only diffraction limited at right angles to the extent of the line. so that the relevant features of this description apply then only to one direction (transversely to the extent of the line).

The procedure of the invention makes it possible to carry out the LSM method at a satisfactory speed and with a reasonable amount of equipment. The invention opens up a wide field of applications that did not exist to date for the principle of high resolution microscopy.

One possibility for implementing the redistribution or more specifically the redistribution element is to use a bundle composed of light conducting fibers. These light conducting fibers can be designed preferably as multi-mode light conducting fibers. The bundle has an input, which is arranged in the plane of detection, and in its contour is sufficient for the expansions of the diffraction-limited still image in the plane of detection. At the output, however, the light conducting fibers are arranged in the geometrical arrangement, which is defined by the detector array and which is different from that of the input. In this case the output-sided ends of the light conducting fibers can be guided directly to the pixels of the detector array. It is especially advantageous, if the output of the bundle is held together in a plug, which can be easily fitted onto a detector line, for example an APD or PMT line.

For a better understanding of the invention, it is important to distinguish between the pixels of the detector array and the image pixels, with which the still image is resolved in the plane of detection. Each image pixel is usually assigned to exactly one pixel of the detector array, but with respect to their arrangement the two pixels are different. The invention is characterized, among other things, by the fact that the radiation at the image pixels is received in the plane of detection, and the size and the arrangement of these image pixels cause an oversampling of the still image. In this way the structure of the still image is resolved, and since this still image is generated in a diffraction limited manner, the structure of said still image is a diffraction pattern. The redistribution element has an input side, at which said image pixels are provided. The input side is located in the plane of detection. The redistribution element directs the radiation at each image pixel to one of the pixels of the detector array. The allocation of image pixels to pixels of the detector array is not maintained by the image structure, for which reason the redistribution is non-imaging in relation to the still image. Therefore, the invention could also be characterized by the fact that in a microscope conforming to its genre, the detector device comprises a non-imaging redistribution element, which comprises an input side, which is located in the plane of detection, and at this input side the radiation is received with the image pixels. Furthermore, the redistribution element comprises an output side, at which the radiation, which is received at the image pixels, is fed pixels of a detector array, whereby the radiation from the input side is redistributed to the output side in a non-imaging manner in relation to the still image. Analogously, the method, according to the invention, could be characterized by the fact that in a method conforming to its genre, the radiation is received in the plane of detection with image pixels, which are redistributed among pixels of the detector array in a non-imaging manner in relation to the still image. The detector array differs with respect to the arrangement and/or the size of its pixels from the arrangement and/or the size of the image pixels in the plane of detection. Furthermore, the image pixels in the plane of detection are provided by the redistribution element in such a way that the diffraction pattern of the still image is oversampled, based on the diffraction limit.

In highly sensitive detector arrays, it is known that when adjacent pixels exhibit large differences in the intensity of radiation, they show interference due to cross talk. In order to avoid such a problem, preference is given to a further development, wherein the light conducting fibers run from the input to the output in such a way that the light conducting fibers, which are adjacent to each other at the output, are also adjacent to each other at the input. Since the diffraction-limited still image shows no abrupt changes in the intensity of the radiation, such a design of the redistribution element automatically ensures that the adjacent pixels of the detector array have the smallest possible difference in intensity of radiation, a feature that minimizes the cross talk.

Instead of a redistribution based on light conducting fibers, it is also possible to provide the redistribution element with a mirror that has mirror elements with varying degrees of tilt. Such a mirror may be designed, for example, as a multi-facetted mirror, a DMD (digital mirror device) or as an adaptive mirror, wherein in the case of the latter two variants a suitable adjusting or more specifically actuation ensures the tilt of the mirror elements. The mirror elements direct the radiation from the plane of detection to the pixels of the detector array, which has a geometric configuration that is different from that of the mirror elements.

The mirror elements show, like the ends of the light conducting fibers in the input to the fiber optic bundle, the image pixels in terms of the resolution of the diffraction pattern of the still image. The size of said image pixels is the decisive factor for the oversampling, not (no longer) the pixel size of the detector array. In this case a group composed of a plurality of individual detectors may also be construed as the detector array, since they are always different in their arrangement (i.e., larger) than the image pixels in the plane of detection.

Various objective lenses are used, as a function of the desired resolution, in the laser scanning microscope. Changing an objective lens alters the expansion of a still image in the plane of detection. Therefore, it is preferred to dispose a zoom optical system upstream of the plane of detection in the imaging direction, in order to adjust the size of the still image to that of the detector device. Such a zoom optical system varies the size of the still image in a percentage range that is significantly less than 100%, therefore, much easier to carry out than a magnification of the size of the still image, which was described as a disadvantage in the introduction.

The sample is also illuminated preferably, as in a conventional LSM, in a scanning manner, although this is not mandatory. Then, however, it is possible to achieve a maximum increase in resolution. If the sample is illuminated in a scanning manner, then it is desirable for the lighting device and the imaging device to have a common scanning device, which guides a light spot across the sample and at the same time over the spot, which is coincident with the light spot and at which the sample is imaged, once again so as to be descanned in relation to the detector, so that the still image is stationary in the plane of detection. In such a configuration, the zoom optical system can be put into the common part of the light and imaging device. Then such a device allows not only the still image to be adjusted to the size of the detector in the plane of detection, but also allows, in addition, the available illumination radiation to be completely coupled into the objective pupil, which may vary with the choice of objective lens, without any edge losses.

A radiation intensity-dependent cross talk between adjacent pixels of the detector array can be reduced, as already stated in the introduction, in the course of the redistribution by means of fiber optic bundles by suitably arranging the light conducting fibers in the bundle. In addition or as an alternative, it is also possible to perform a calibration. For this purpose each light conducing fiber is exposed, one after the other, to radiation; and the interference signal in adjacent pixels is detected. Such an approach makes it possible to construct a calibration matrix, with which during subsequent microscopy of the sample, a radiation intensity-dependent cross talk between adjacent pixels is corrected.

In addition, the resolution of the diffraction pattern of the still image also allows the direction, in which the spot is moving and along which the sample is moved while sampling, to be determined. Although this direction of movement is known, in principle, from the mechanism of the scanner (such as a scanning mirror or a movable sample table), there are in this case residual inaccuracies caused by the mechanism. These inaccuracies can be eliminated by evaluating the signals of the individual pixels of the detector array by means of a cross correlation. Such an approach makes use of the fact that, based on the adjacent image pixels in the sample, the signals overlap to some extent due to the diffraction-limited imaging of the spot, but their centers lie side by side. If the signals of such image pixels are subjected to a cross correlation, then it is possible to reduce or totally eliminate a residual inaccuracy, which remains due to the unavoidable tolerances of the scanning mechanism.

In addition to the higher resolution, a temporal variation of the fluorescence in the detection volume, detected by the spot, can be detected by means of a spatial and temporal correlation of the signals from a series of measurements of the individual detector elements (which are assigned to image pixels in the plane of detection). For example, diffusion coefficients can be determined from a temporal correlation, as in fluorescence correlation spectroscopy; and also diffusion, directed between image pixels and diffusion barriers can be visualized through the inclusion of the spatial correlation. In addition and beyond this feature, the movement sequences of the fluorescent molecules are of great interest for tracking applications, because the light spot is supposed to track the movement of the fluorescent molecules. The arrangement, described herein, makes it possible to determine with very high accuracy the direction of movement even within a pixel illumination period. Therefore, it is preferred as a further development that variations in the sample be detected by determining and evaluating a temporal variation of the diffraction-limited still image, when the point spot or the line spot is stationary in the sample.

Moreover, the procedure, according to the invention, allows the distribution of light to be modified during scanned illumination, for example, by means of a phase filter. With such a phase filter it is very easy to implement the method, as described in Gong et al., Opt. Let., 34, 3508 (2009).

In so far as a method is described herein, a control device executes these process steps, when the microscope is running.

It goes without saying that the aforementioned features and those to be explained below can be used not only in the specified combinations, but also in other combinations or alone without departing from the scope of the present invention.

BRIEF DESCRIPTION OF THE DRAWINGS

The invention is explained in greater detail below, for example, with reference to the accompanying drawings, which also disclose features that are essential to the invention. The drawings show in:

FIG. 19 shows a schematic for a detection unit for detecting a high resolution image for two color channels.

DESCRIPTION OF THE EMBODIMENTS

Figure 1:
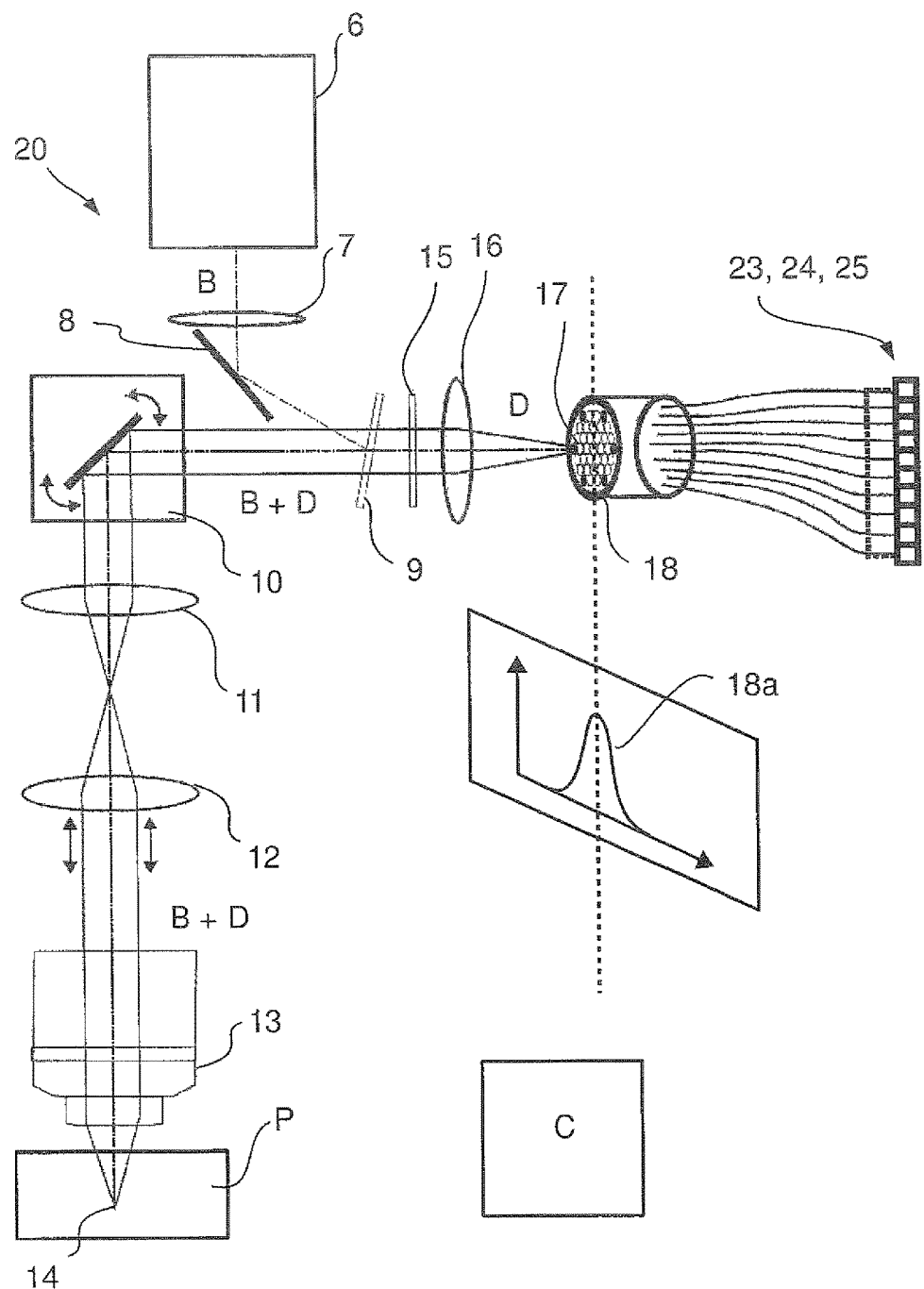
FIG. 1 is a schematic representation of a laser scanning microscope for high resolution microscopy.

FIG. 1 shows in schematic form a laser scanning microscope 1, which is designed for microscopying a sample 2. The laser scanning microscope 1 (hereinafter also referred to by the acronym LSM) is controlled by means of a control device C and comprises an illuminating beam path 3 as well as an imaging beam path 4. The illuminating beam path illuminates a spot in the sample 2, and the imaging beam path 4 images this spot in a diffraction limited manner for detection. The illuminating beam path 3 and the imaging beam path 4 share a plurality of elements. However, this is no more mandatory than a scanned spot illumination of the sample 2, which could also be wide-field illuminated.

In the case of a laser scanning microscope 1, the sample 2 is illuminated by means of a provided laser beam 5, which is coupled into a mirror 8 by means of a deflecting mirror 6, which does not go beyond what is operationally necessary, and a lens 7. The mirror 8 ensures that the laser beam 5 falls onto an emission filter 9 at a reflection angle. For a better overview of the drawing, only the main axis of the laser beam 5 is shown.

After being reflected at the emission filter 9, the laser beam 5 is deflected biaxially from a scanner 10 and is focused by means of the lenses 11 and 12 through an objective lens 13 into a spot 14 in the sample 2. In the drawing in FIG. 1, the spot has the shape of a point, but a linear spot is also possible. The fluorescence radiation, excited in the spot 14, passes through the objective lens 13, the lenses 11 and 12 until it reaches again the scanner 10, after a stationary light beam is present again in the imaging direction. This light beam falls through the emission filters 9 and 15, which have the function of selecting the fluorescence radiation in the spot 14 in terms of its wavelength and, in particular, of separating from the illumination radiation of the laser beam 5, which can be used, for example as the excitation radiation. A lens 16 ensures that the spot 14 is imaged in its entirety into a diffraction-limited image 17, which is located in a plane of detection 18. The plane of detection 18 is a conjugate plane relative to the plane, in which the spot 14 in the sample 2 is located. The image 17 of the spot 14 is captured by a detector device 19 in the plane of detection 18. This detector device will be explained in greater detail below with reference to the FIGS. 2 to 4. What is important at this point is that the detector device 19 spatially resolves the diffraction-limited image 17 of the spot 14 in the plane of detection 18.

The intensity distribution of the spot over the detection cross section (Gaussian distribution) in 18 is shown underneath as 18a in FIG. 1.

The control device C controls all of the components of the LSM 1, in particular, the scanner 10 and the detector device 19. The control device records the data of each image 17 for the different scan positions, analyzes the diffraction pattern of said image and generates a high resolution composite image of the sample 2.

The LSM 1 from FIG. 1 is shown, by way of example, for a single spot, which is sampled on the sample. However, said LSM can also be used for the sampling according to a line spot, which extends, for example, perpendicular to the plane of the drawing in FIG. 1. It is also possible to design the LSM 1 from FIG. 1 in such a way that a plurality of adjacent point spots are sampled in the sample. Then their respective still images 17 also lie next to each other in the plane of detection 18. Then the detector device 19 is designed accordingly, in order to detect the adjacent still images 17 in the plane of detection 18.

Figure 2:
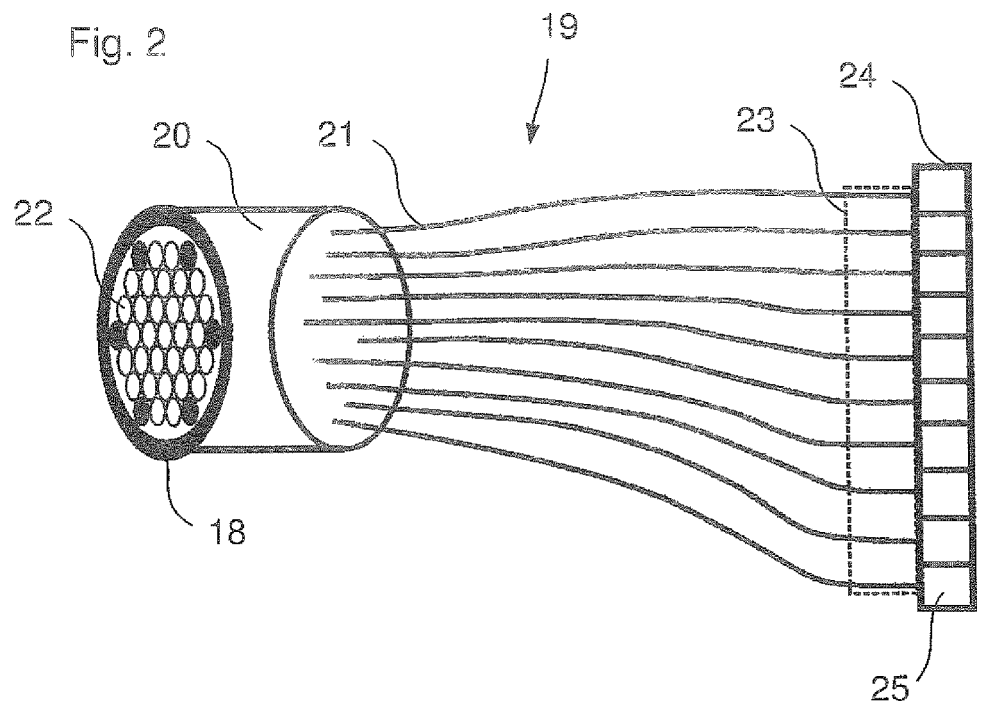
FIG. 2 is an enlarged view of a detector device of the microscope from FIG. 1.

The detector device 19 is shown on a larger scale in FIG. 2. Said detector device consists of a fiber optic bundle 20 that feeds a detector array 24. The fiber optic bundle 20 is composed of individual light conducting fibers 21. The ends of the light conducting fibers 21 form the input 22 to the fiber optic bundle; and this input is located in the plane of detection 18. Hence, the individual ends of the light conducting fibers 21 constitute the pixels, with which the diffraction-limited image 17 of the spot 14 is captured. Since the spot 14 in the embodiment from FIG. 1 is, by way of example, a point spot, the image 17 is an Airy disk, the expansion of which is located inside the circle, which illustrates the plane of detection 18 in the FIGS. 1 and 2. Therefore, the expansion of the input 22 to the fiber optic bundle is large enough to cover the expansion of the Airy disk. The individual light conducting fibers 21 in the fiber optic bundle 20 are brought at their outputs into a different geometrical arrangement than at the input 22 to the fiber optic bundle, i.e., in the form of an elongated plug 23, in which the output-sided ends of the light conducting fibers 21 lies next to each other. The plug 23 is designed in such a way that it matches the geometric arrangement of the detector line 24. That is, each output-sided end of a light conducting fiber 21 is located exactly in front of a pixel 25 of the detector line 24.

Figure 3:
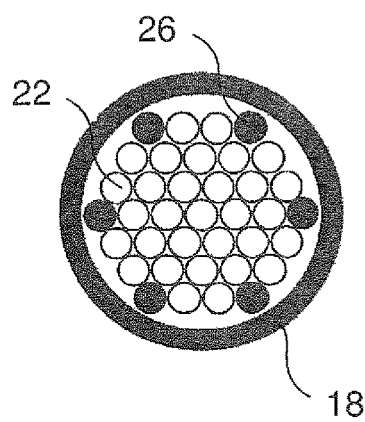
FIGS. 3 and 4 are plan views of possible embodiments of the detector device 19 in a plane of detection.
Figure 4:
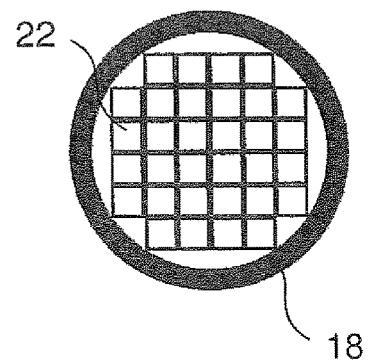

The geometric extent of the redistribution element is always adjusted, i.e., independently of its implementation, which is achieved by means of a fiber optic bundle in FIG. 4, on the input side to the expansion of the still image (or in the case of a plurality of point spots, adjusted to the adjacent still images). The redistribution element has the function of receiving the radiation from the plane of detection 18 in such a way that, measured against the sampling theorem, the intensity distribution of the still image 17 is oversampled, based on the diffraction limit. As a result, the redistribution element has pixels, which are located in the plane of detection 18 (in the design in FIG. 3 said pixels are formed by the input ends of the light conducting fibers) and which are smaller by at least a factor of 2 than the smallest resolvable structure resulting from the diffraction limit, taking into consideration the magnification in the plane of detection 18.

Of course, the use of a plug 23 is only one of many possibilities of disposing the output-sided ends of the light conducting fibers 21 upstream of the pixels 25. Similarly it is possible to use other connections. It is even possible to fuse the individual pixels 25 directly to the light conducting fibers 21. It is not even necessary to use a detector line 24; instead, a single detector may be used for each pixel 25.

FIGS. 3 and 4 show optional embodiments of the input 22 to the fiber optic bundle. The light conducting fibers 21 can be fused together at the input 22 to the fiber optic bundle. This approach achieves a higher fill factor. That is, the gaps between the individual light conducting fibers 21 at the input 22 to the fiber optic bundle can be minimized. On the other hand, fusing generates, on the one hand, a degree of cross talk between adjacent light conducting fibers. If this situation is to be avoided, then the light conducting fibers may be glued. Even a square arrangement of the ends of the light conducting fibers 21 is possible, as shown in FIG. 4.

Preferably, the individual light conducting fibers 21 are assigned to the individual pixels 25 of the detector array 24 in such a way that the light conducting fibers 21, which lie next to each other at the input 22 to the fiber optical bundle, also lie next to each other at the detector array 24. This procedure minimizes the cross talk between adjacent pixels 25, a phenomenon that can be generated, for example, by the scattered radiation or in the signal processing of the individual pixels 25. If the detector array 24 is a line, then the corresponding arrangement can be achieved by defining the order of sequence of the individual light conducting fibers on the detector line by means of a spiral, which in the plan view of the plane of detection 18 connects the individual light conducting fibers one after the other in succession.

In addition, FIG. 3 shows reactive fibers 26 that are located in the corners of the arrangement of the light conducting fibers 21 at the input 22 to the fiber optic bundle. These reactive fibers are not guided to the pixels 25 of the detector array. Those locations of the reactive fibers would no longer have the signal intensity that is required to evaluate the signals. This arrangement can be used to reduce the number of light conducting fibers 21 and, as a result, the number of pixels 25 in the detector line 24 or the detector array in such a way that one can work, for example, with 32 pixels. Such detector lines 24 are already in use elsewhere in laser scanning microscopes, a feature that has the advantage that the electronic system for evaluating the signal need only be provided once in such laser scanning microscopes and is switched over between an already existing detector line 24 and the additional detector line 24, which was added by means of the detector device 19.

According to FIG. 4, light conducting fibers having a square basic shape are used for the bundle. These light conducting fibers also exhibit a high degree of coverage in the plane of detection and, as a result, collect the radiation efficiently.

Figure 5:
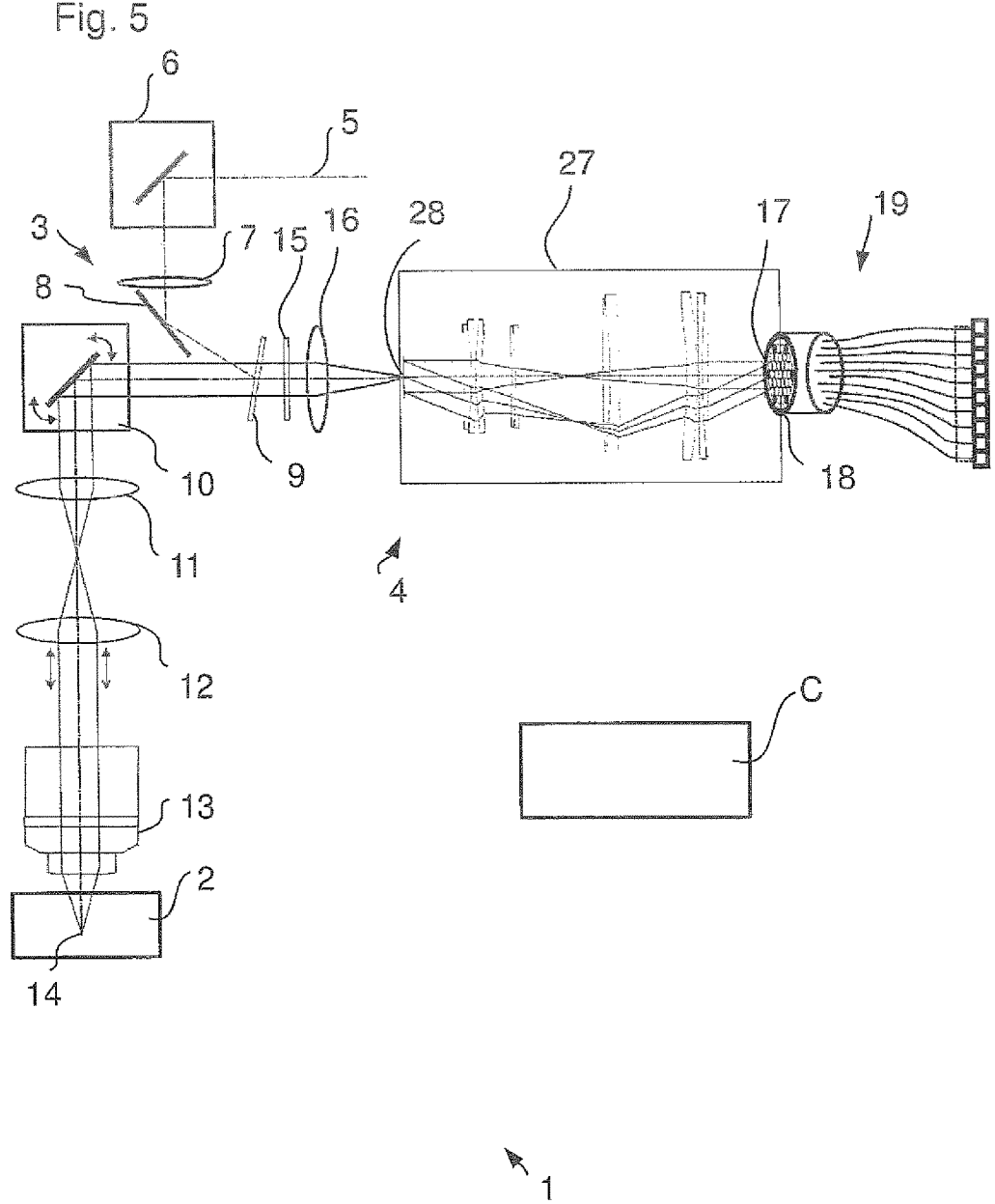
FIG. 5 is a further development of the microscope from FIG. 1 by means of a zoom optical system for adjusting the size of the detector field.

FIG. 5 shows a further development of the LSM 1 from FIG. 1, where a zoom optical system 27 is disposed upstream of the plane of detection 18. The conjugate plane, in which the plane of detection 18 was arranged according to the design from FIG. 1, now forms an intermediate plane of the image 28, from which the zoom optical system 27 receives the radiation and directs said radiation to the plane of detection 18. The zoom optical system 27 allows the image 17 to be optimally adjusted to the expansion of the input of the detector device 19.

Figure 6:
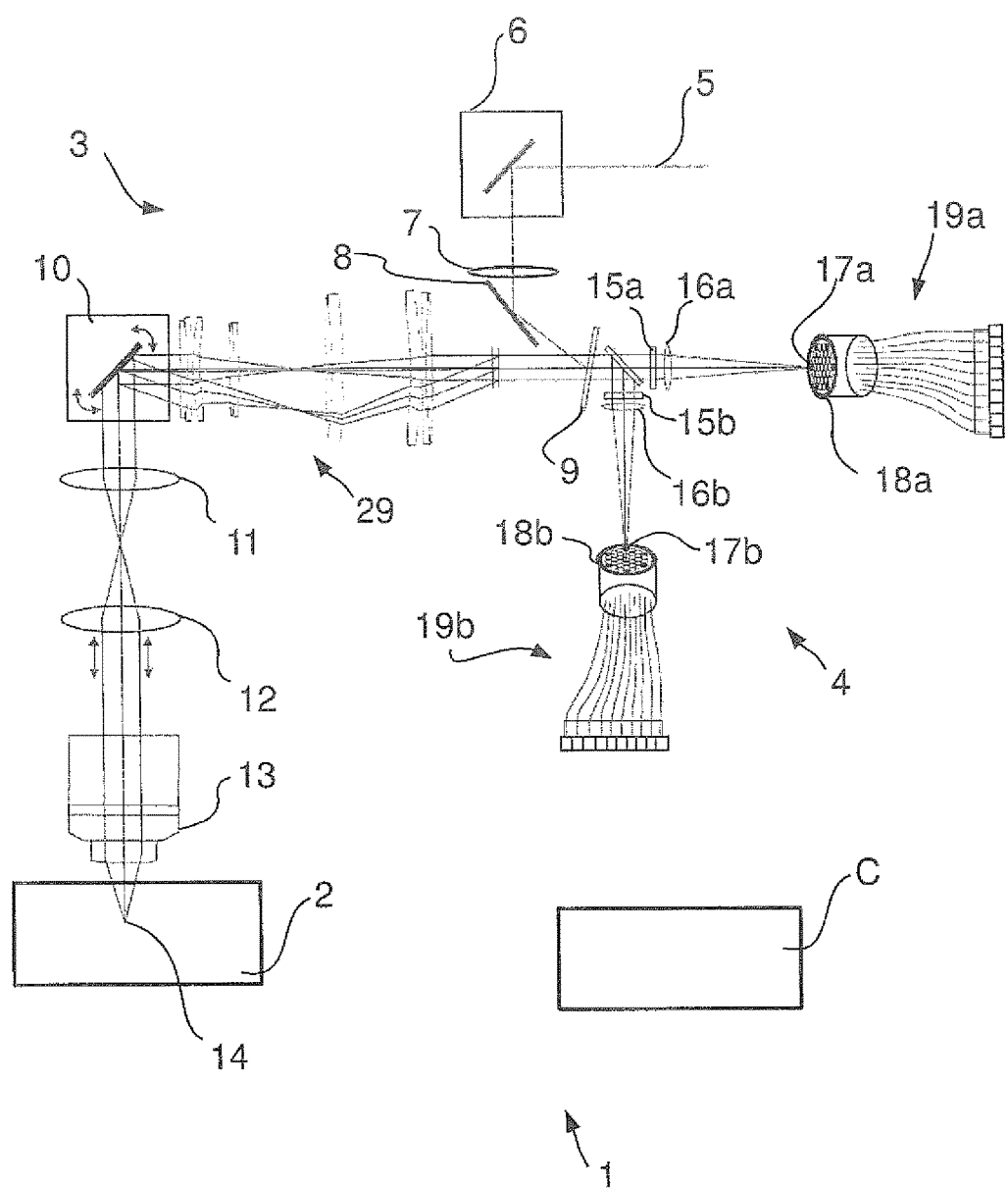
FIG. 6 is a modification of the microscope from FIG. 5 with respect to the zoom optical system as well as with respect to a further development for multi-colored imaging.

FIG. 6 shows yet another modification of the laser scanning microscope 1 from FIG. 1. First of all, in this case the zoom optical system 29 is arranged in such a way that it is in the part of the beam path, through which both the illumination beam path 3 and the imaging beam path 4 pass. The advantage that is gained by such a modification is that not only the size of the image 17 on the input side of the detector device 19 can be adjusted, but it is also possible to adjust with respect to the imaging beam path 4 the pupil filling of the objective lens 13 and, therefore, the use of the laser beam 5.

In addition, FIG. 6 also shows the LSM 1 designed as two channels by disposing a beam splitter downstream of the emission filter 9. In this case the beam splitter separates the radiation into two separate color channels. The corresponding elements of the color channels correspond in each instance to the elements, which are disposed downstream of the emission filter 9 in the imaging direction in the LSM 1 from FIG. 1. The color channels are distinguished by the reference suffix "a" or "b" in the drawing in FIG. 6.

Naturally, the provision of two color channels is independent of the use of the zoom optical system 29. However, this combination has the advantage that a zoom optical system 27, which would have had to be provided in each one of the two color channels and, as a result, there would have been two such optical systems, need only exist once. However, it goes without saying that the zoom optical system 27 can also be used in the design according to FIG. 1; and the LSM 1 from FIG. 6 can also be implemented without the zoom optical system 29.

Figure 7:
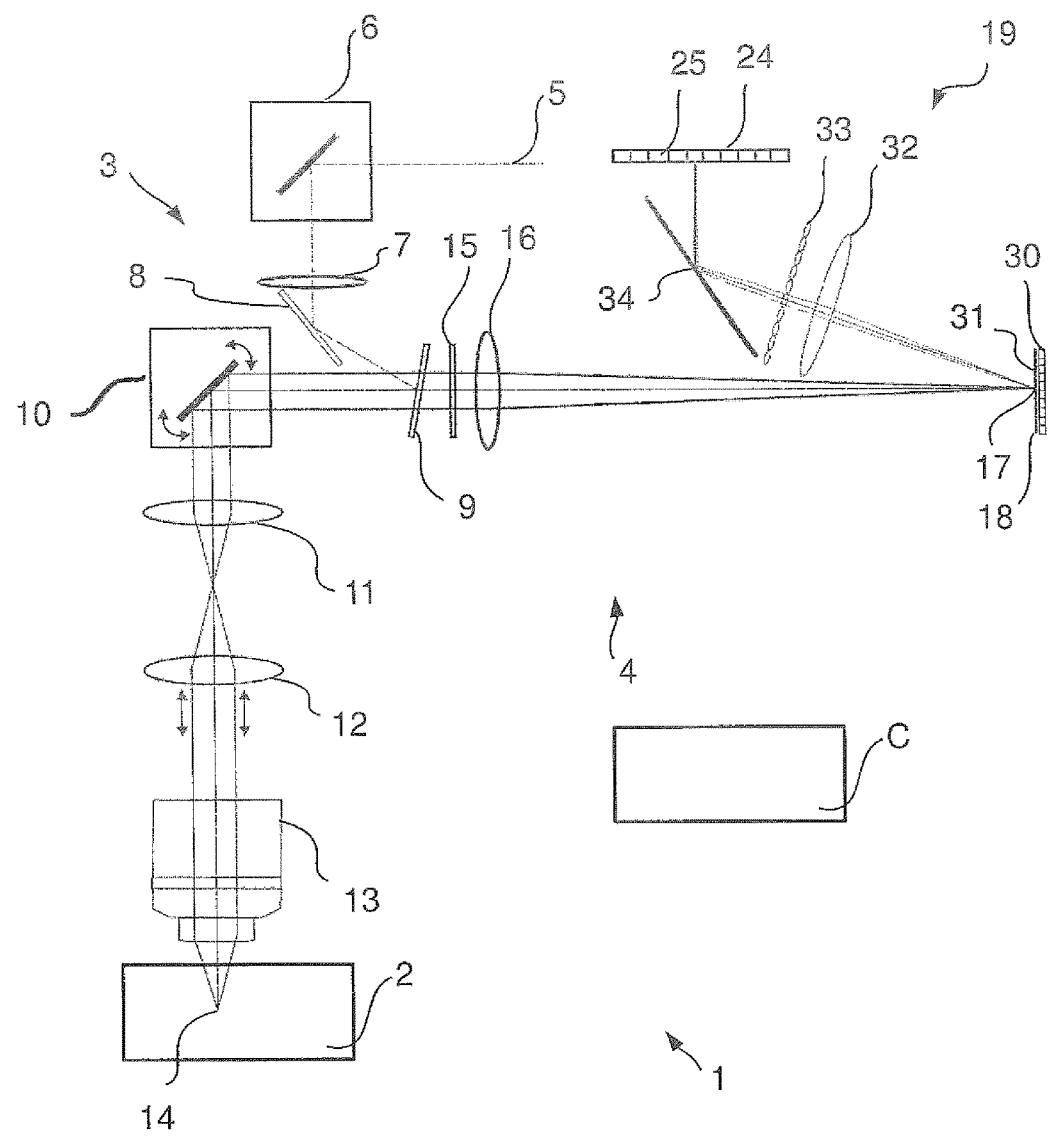
FIG. 7 is a modification of the microscope from FIG. 1, wherein the modification relates to the detector device.

FIG. 7 shows a modification of the LSM 1 from FIG. 1 with respect to the detector device 19.

At this point, the detector device 19 has a multi-facetted mirror 30, which has individual facets 31. The facets 31 correspond with respect to the resolution of the image 17 to the ends of the light conducting fibers 21 at the input 22 to the fiber optic bundle. The individual facets 31 differ with respect to their tilt relative to the optical axis of the incident radiation. Together with a lens 32 and a mini lens array 33 as well as a deflecting mirror 34, which is used only for beam folding, each facet 31 images a section of the surface area of the still image 17 onto a pixel 25 of a detector array 24. Depending on the orientation of the facets 31, the detector array 24 in this case may be preferably a 2D array, but a detector line is also possible.

Figure 8:
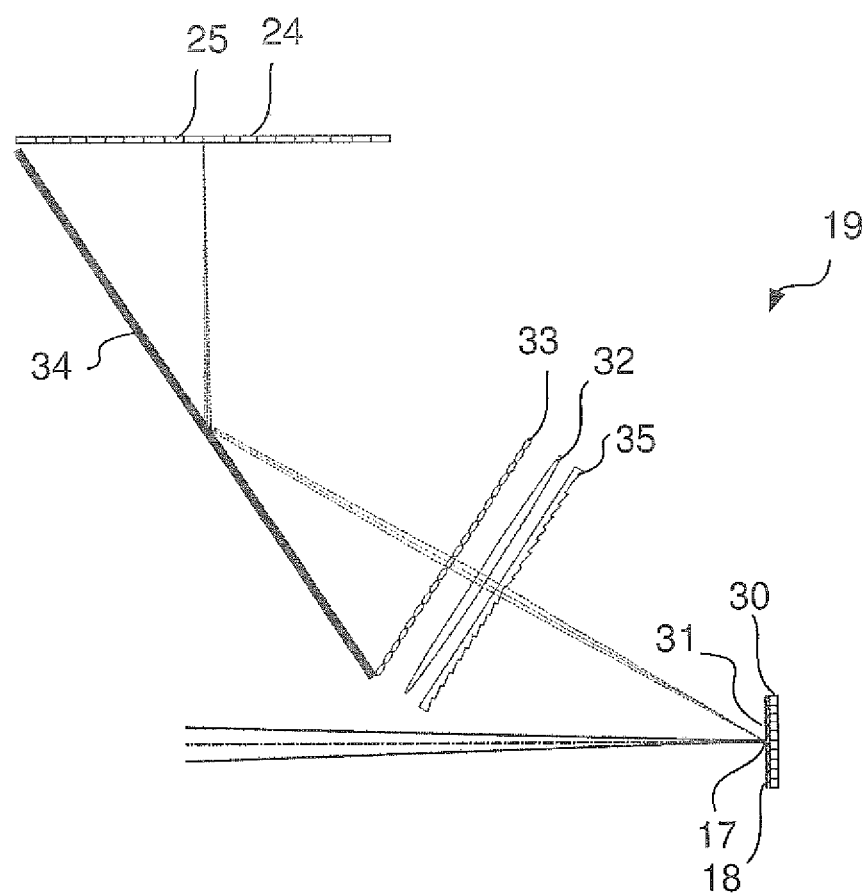
FIG. 8 is a modification of the detector device 19 from FIG. 7.

FIG. 8 shows a further development of the detector device 19 from FIG. 7. In this case a refractive element 35 is also disposed upstream of the lens 32; and this refractive element distributes the radiation especially well over a detector line.

The detector array 24 may be chosen, as stated above, with regard to its geometry, without additional restraints. Of course, then the redistribution element in the detector device 19 should be adjusted to the corresponding detector array. The individual pixels, with which the image 17 is resolved, are no longer defined in terms of their size by means of the detector array 24, but rather by means of the element that implements the redistribution of the radiation from the plane of detection 18. In the case of an Airy disk the diameter of the disk during diffraction-limited imaging is calculated according to the formula $1.22\lambda/NA$, wherein $\lambda$ is the average wavelength of the imaged radiation, and NA is the numerical aperture of the objective lens 13. Then the full width at half maximum is $0.15\lambda/NA$. In order to achieve a high resolution, it is sufficient to make the spatial resolution during the detection twice as high as the full width at half maximum. That is, the full width at half maximum is sampled twice. As a result, a facetted element 31 and/or an end of a light conducting fiber 21 at the input 22 to the fiber optic bundle may be at most half as large as the full width at half maximum of the diffraction-limited still image. Naturally this applies, taking into consideration the magnification, which the optical system downstream of the objective lens 13 produces. Therefore, in the simplest case a 4×4 array of pixels in the plane of detection 18 per full width at half maximum would more than suffice.

The zoom optical system, which was explained with reference to FIGS. 5 and 6, allows not only an adjustment such that the diffraction distribution of the diffraction-limited image 17 of the spot 14 optimally fills the input area of the detector device 19, but also allows an additional operating mode, when, in particular, more than one Airy disk is imaged into the plane of detection 18. During a measurement, during which more than one Airy disk is imaged onto the detector device 19, light from other depth levels of the sample 2 is detected at the outer pixels of the detector device 19. The net result is that in the course of processing the image, additional signal strength is obtained without any adverse impact on the depth resolution of the LSM 1. Hence, the zoom optical system 27 or 29 allows a compromise between the signal-to-noise ratio of the image and the depth resolution.

The solutions, presented in FIGS. 1 to 8, lend themselves well to obtaining data with a higher spatial resolution for one range of wavelengths. However, for many applications it is desirable to obtain data for a plurality of wavelengths.

In this case a sequential data acquisition has the drawback that, on the one hand, the acquisition time takes more than twice as long, because in addition to the capturing of the image, additional time is needed to change the filters and to change the magnification of the imaging on the fiber bundle.

Figure 9:
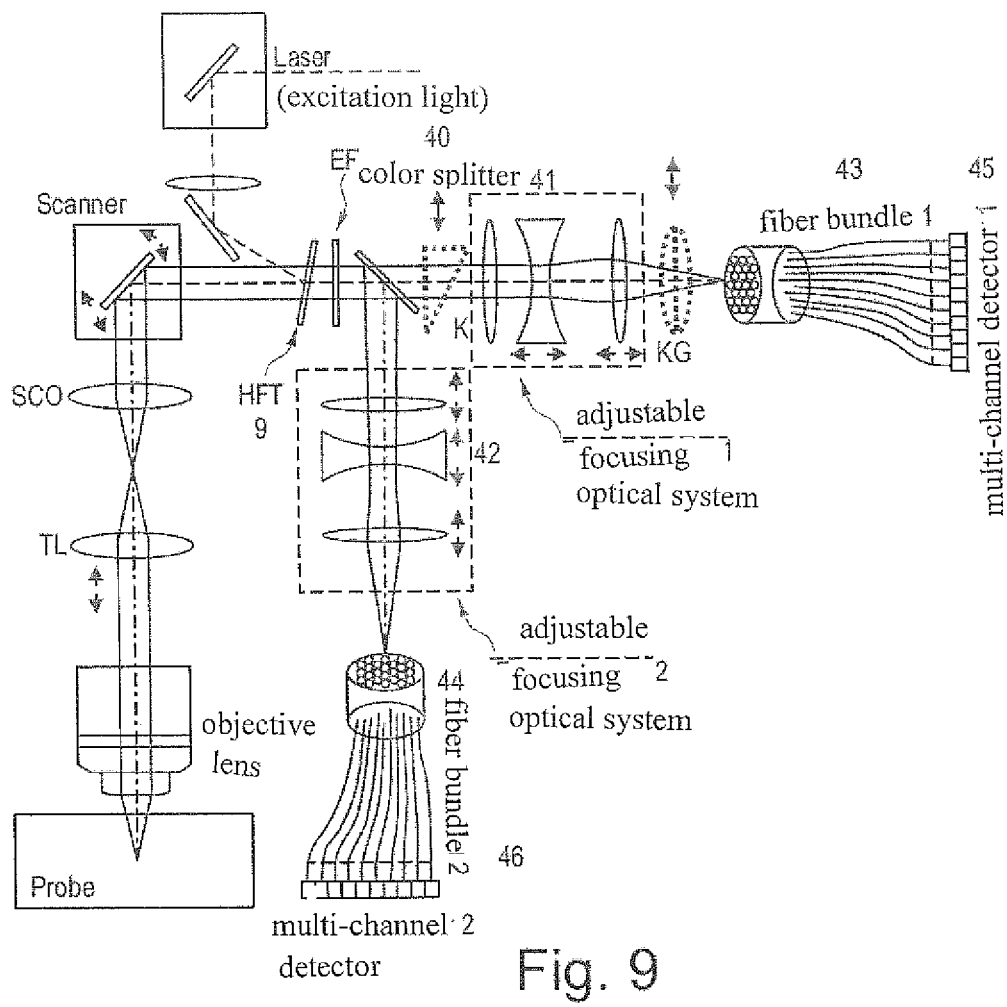
FIG. 9 shows a laser scanning microscope arrangement for high resolution observation of a sample in two different wavelength ranges by means of doubling the detector and the fiber bundle.

By doubling the detector arrangement and a spectral splitting of the signal by means of dichroic beam splitters, it is possible to obtain real time data for two ranges of wavelengths (see FIG. 9). However, sensitive detectors are cost drivers in such an arrangement. Furthermore, in addition to an additional detector, a computing unit is also required for real time data acquisition. Finally two real time systems have to be controlled simultaneously. As a result, such an approach of doubling the detection unit is associated with considerable additional costs.

FIG. 9 shows a laser scanning microscope arrangement for high resolution observation of a sample in two different wavelength ranges by means of doubling the detector and the fiber bundle.

A color splitter 40 divides the detection beam path into two partial beam paths having different wavelength ranges.

In each case an adjustable focusing optical system 41 or 42 as well as the fiber bundles 43, 44 and the multi-channel detectors 45, 46 are provided, as already described above.

The object of the present invention is to avoid the described drawbacks.

The present invention is characterized by the features disclosed in the independent patent claims.

Preferred further developments are the subject matter of the dependent claims.

The invention is explained in detail below, in particular, with reference to the drawings in FIGS. 9 to 19.

The reference numerals of the FIGS. 9 to 19 mean:
- 40: color splitter
- 41, 42: adjustable focusing optical system
- 43, 44: fiber bundle
- 45, 46, 47: multi-channel detector
- 48, 49: fiber bundle
- 50, 51: detector ranges
- 52: adjustable focusing optical system
- 53, 54: adjustable optical system
- 55: deflecting mirror that can be pivoted into position
- 56: fiber bundle
- 57, 58, 59: fiber bundle
- 60, 61, 62: detector ranges
- 63: light barrier/color filter
- 64, 65: fiber bundle
- 66, 67, 68: detector ranges
- 69: fiber bundle
- 70: multi-channel detector
- 71: color splitter
- 72: mirror The starting point of the present invention is based on being able to detect two wavelength ranges with a single multi-channel detector in such a way that a sub-Airy sampling of the sample signal can be carried out for both wavelength ranges.

The detectors that are used in such an arrangement, as described, for example, in the DE 102012204128 A1, may be, for example gallium arsenide phosphide (GaAsP) detectors or multi-alkali detectors, which consist of 32 individual channels. In order to calculate high resolution images according to the methods proposed by Colin Sheppard et al., in Optik 80, no. 2, 53 (1982), the Airy disk has to be oversampled at least twice per spatial direction. For this reason the present invention proposes that, for example, 32 channels of a detector be divided into two groups of 16 channels each. Each group of 16 channels is used to detect the sample signal with suitable oversampling of the Airy disk. A computation of the respective 16 channel images for one range of wavelengths results in a high resolution image.

In a laser scanning microscope arrangement the sample signal is split spectrally into two beam paths (see FIG. 9 for this purpose) with, for example, a dichroic color splitter.

Figure 10:
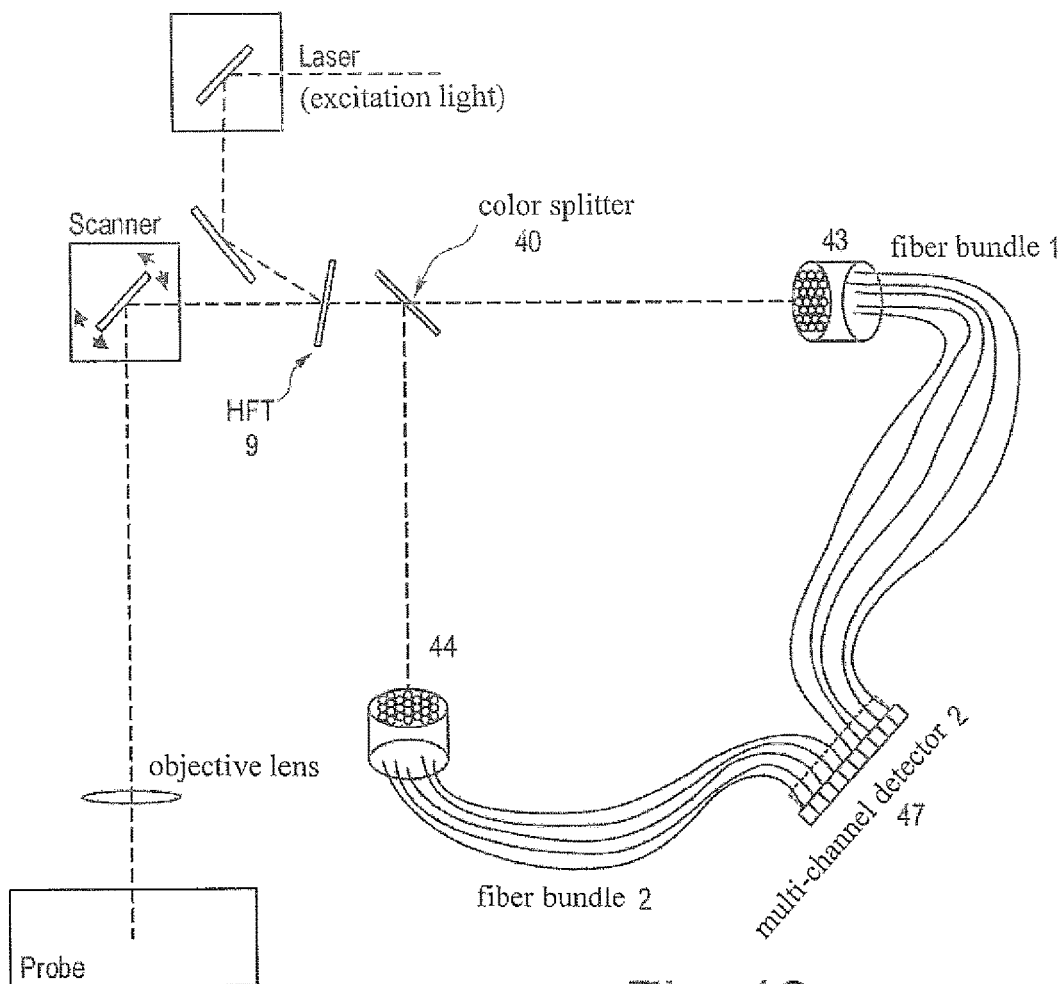
FIG. 10 shows in schematic form a laser scanning microscope, with which data for two wavelength ranges can be obtained simultaneously with a single detection unit.

FIG. 10 shows in schematic form a laser scanning microscope, with which data for two wavelength ranges can be obtained simultaneously with a single detection unit. For this purpose the sample light is split spectrally with a color splitter 40 and is directed to two fiber bundles 43, 44, which allow a sub-Airy sampling of the signal. Then the two fiber bundles direct the light to a common multi-channel detector 47.

Then an imaging optical system can be used to image the sample plane for the two beam paths of the spectral ranges on the two fiber bundles, which consist advantageously of 16 channels each.

The plane of the sample is arranged in such a way that it is optically conjugate to the plane of the entry faces of the fiber bundles. Then the respective fiber bundles guide the light of both wavelength ranges to a common detector. Such a fiber arrangement is shown, by way of example, in schematic form in FIG. 11.

Said figure shows a fiber arrangement for simultaneously capturing images with a higher resolution for two wavelength ranges. In this case the fibers 1 to 16 in a first plug or fiber bundle 48 (on the left in the figure) are assigned to a first wavelength range; the fibers 17 to 32 in a second plug or fiber bundle 49 are assigned to a second wavelength range. Both plugs are located in a plane of the image that corresponds to a plane of the pinhole.

Then the fibers of both plugs are combined in one region 50 and 51 on the detector 47 (on the right in the figure), in order to guide the light of both wavelength ranges to a common detector line 47 having 32 channels.

In order to be able to guarantee a stable reconstruction of high resolution images on the basis of the twice 16 detection channels, it is important, on the one hand to perform a correction for the cross talk between the individual channels (not only over the light conducting fibers but also at and in the detector). This correction can be performed, for example, by means of a calibration measurement, during which a defined quantity of light is introduced in succession into each fiber, and the signal is measured in all of the channels. The resulting matrix can be inverted, in order to assign a distribution of the intensity to the fibers to a measured signal at the detector.

Figure 11:
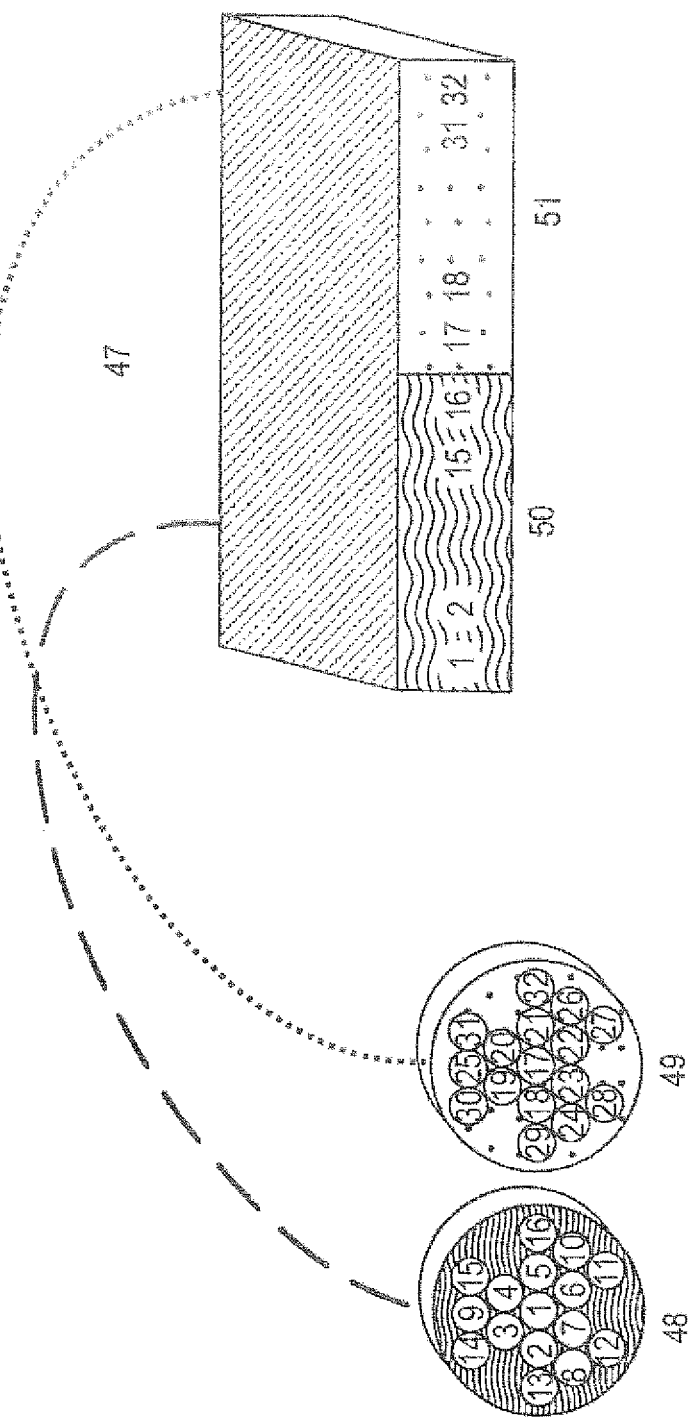
FIG. 11 shows in schematic form a fiber arrangement.

On the other hand, it has to be ensured that the fibers in the two fiber bundles 48, 49 are arranged in such a way that the sub-sampling of the Airy disk is guaranteed. The arrangement, shown in FIG. 11, is based on a hexagonal arrangement of round fibers. For the horizontal direction the Airy disk can be detected with the fibers 13, 2, 1, 5 and 16. For this purpose the fibers 14, 3, 1, 6 and 11 are at a 60 deg. angle; and the fibers 15, 4, 1, 7 and 12 are at a 120 deg. angle. This approach satisfies the objective of achieving the above specified sampling criterion for three orientations. The additional fibers 8, 9 and 10 improve, on the one hand, the collecting efficiency and, in so doing, the signal-to-noise ratio; and, on the other hand, the sampling for the other orientations is improved.

The described arrangement of the fibers is not limited to fibers having a round diameter. Such an arrangement also lends itself to hexagonal fibers. In the case of square fibers, for which this arrangement is also possible, it is expedient to arrange said fibers in a square matrix of 4×4 elements. In this case a sampling of 4 fibers for the different directions of an Airy disk is achieved.

When viewing an object at a plurality of wavelengths with a microscope, it should be noted that the size of the Airy disk is a function of the wavelength. Said size is directly in proportional to the wavelength. The net result is that for an optimal sampling of the Airy disk the imaging onto the fibers for the two wavelength ranges requires an adjustment. The invention provides a number of possible solutions for this problem.

Figure 12:
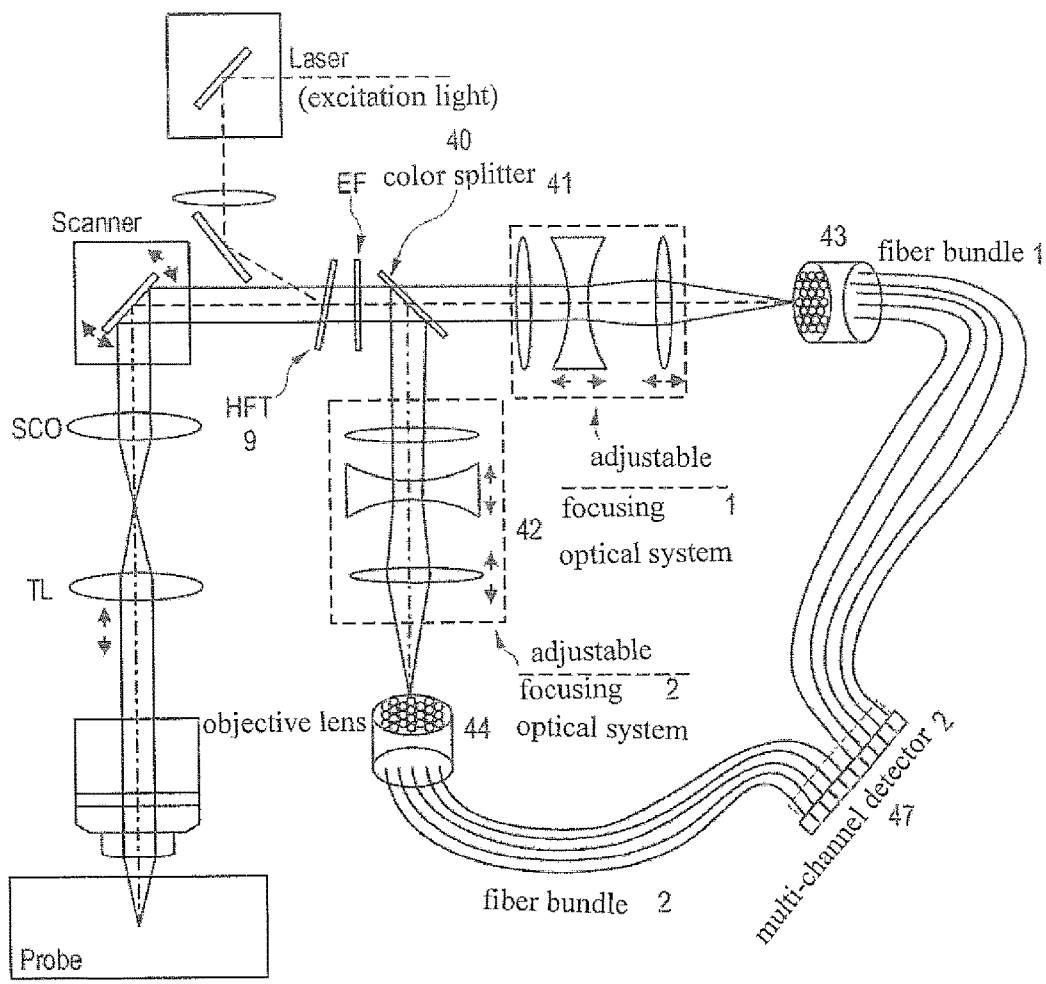
FIG. 12 shows a first solution for adjusting the optical system to the different pupil sizes for the two wavelength ranges that are to be detected.

A zoom system 41, 42 is used for each of the two beam paths in order to achieve an optimal sampling for both ranges (see also FIG. 12). Such an arrangement is distinguished by its maximum flexibility.

FIG. 12 shows a first solution for adjusting the optical system to the different pupil sizes for the two wavelength ranges that are to be detected. In this case each of the two detection channels has its own adjustable focusing optical system 41, 42. This solution offers the maximum flexibility.

As an alternative, it is possible to use jointly a part of the zoom system for both wavelength ranges. Then the beam is split downstream of a jointly used part of the zoom system 52 (see also FIG. 13). Such an arrangement is just as flexible as the first solution, but it is more cost effective and more compact.

Figure 13:
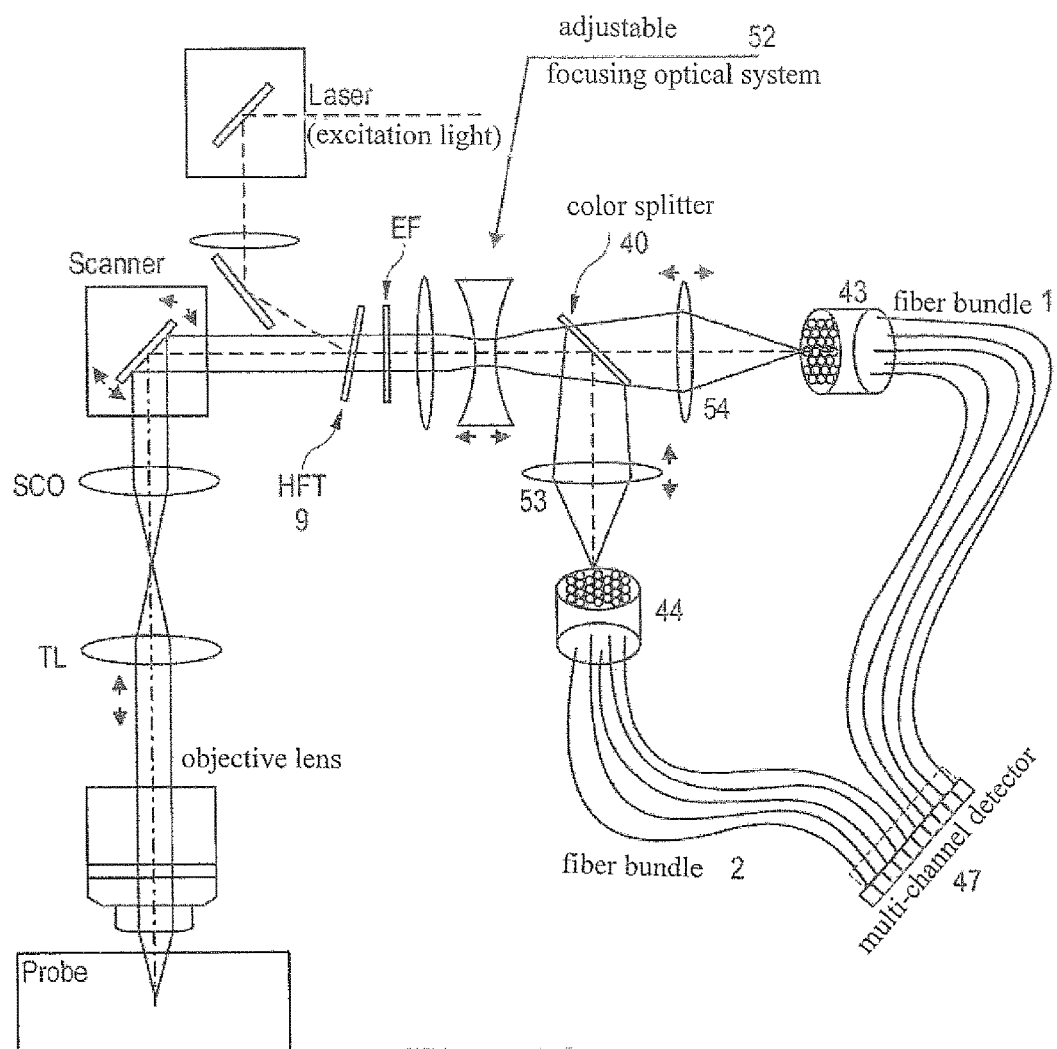
FIG. 13 shows a second solution for adjusting the optical system to the different pupil sizes for the two wavelength ranges that are to be detected.

FIG. 13 shows a second solution for adjusting the optical system to the different pupil sizes for the two wavelength ranges that are to be detected. In this case both detection channels have a common adjustable focusing optical system 52. Then in the separated beam paths the adjustment to the pupil sizes is performed with the optical elements 53, 54, which can be moved along the optical axis.

This solution is more or less as flexible as the solution described above with reference to FIG. 12.

In principle, there are typical combinations of wavelength ranges that are to be measured simultaneously. This follows from typical combinations of colorants that are used to stain biological samples. If one considers the ratios of the central wavelengths for typical combinations, the result is a value of $\lambda_1/\lambda_2 \approx 1.15$. This ratio can be used to simplify the optical system even more:

The wavelength of the detection light is not split, as in FIG. 13, until downstream of a jointly used zoom system 52. Then the imaging of the detection channel of longer wavelength is reduced by, for example, a factor of about 1.15, so that the imaging for both wavelength ranges is identical to the size of the Airy disk on the two fiber bundles (see also FIG. 13).

Figure 14:
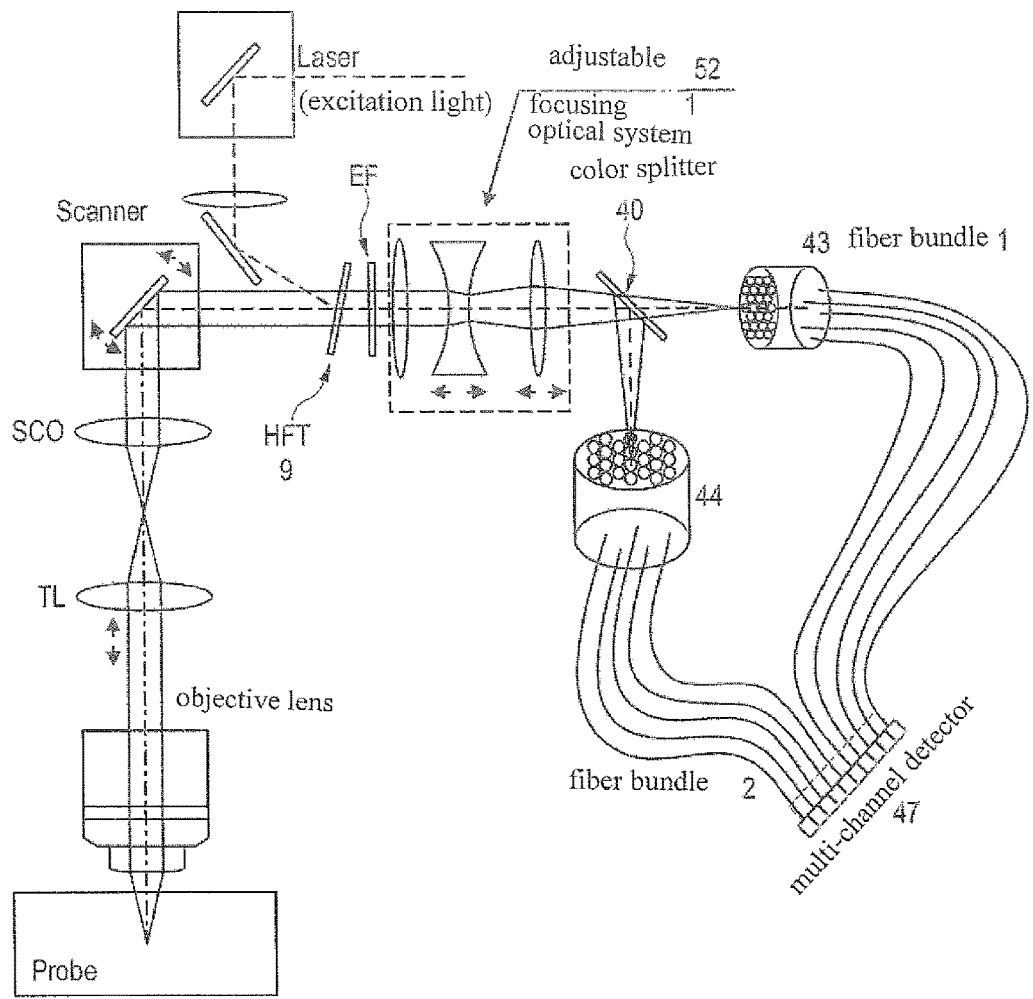
FIG. 14 shows such a solution for adjusting the optical system to the different pupil sizes for the two wavelength ranges that are to be detected.

As an alternative, fibers with a diameter (and also the diameter of their bundle) which are precisely a ratio of, for example, 1.15 are used in the two fiber bundles (see FIG. 14). This measure eliminates the need for an additional optical system in one of the two detection channels.

FIG. 14 shows such a solution for adjusting the optical system to the different pupil sizes for the two wavelength ranges that are to be detected. In this case both detection channels have a common adjustable focusing optical system 52. The adjustment to the pupil sizes is carried out by changing the diameter of the fibers and the diameter of the fiber bundle in 43, 44; they are at a fixed ratio to each other, i.e. in accordance with the typical wavelength ratios.

Then and finally there is also the option of dispensing with both an additional optical system and the different fiber diameters. In this case it is advisable to select either an optimal sampling for one range of wavelengths while simultaneously accepting the fact that the sampling will be poorer for the second wavelength range, or to adjust the zoom in such a way that the Airy disk is about 7.5% too big on one fiber bundle and about 7.5% too small on the second bundle. Such effects can be taken into consideration, but they do not lead to an optimal increase in resolution.

As an alternative, the adjustable focusing optical system is configured in such a way that it has a transverse chromatic aberration, which just about compensates for the enlargement of the Airy disk.

In all of the arrangements described above, the color splitters can be replaced with an appropriate mechanism, in order to make the choice of both wavelength bands flexible.

In principle, the described arrangements and variants can also be expanded to include more than just two ranges of wavelengths. Such an expansion requires additional color splitting and division of the detector channels.

Figure 15:
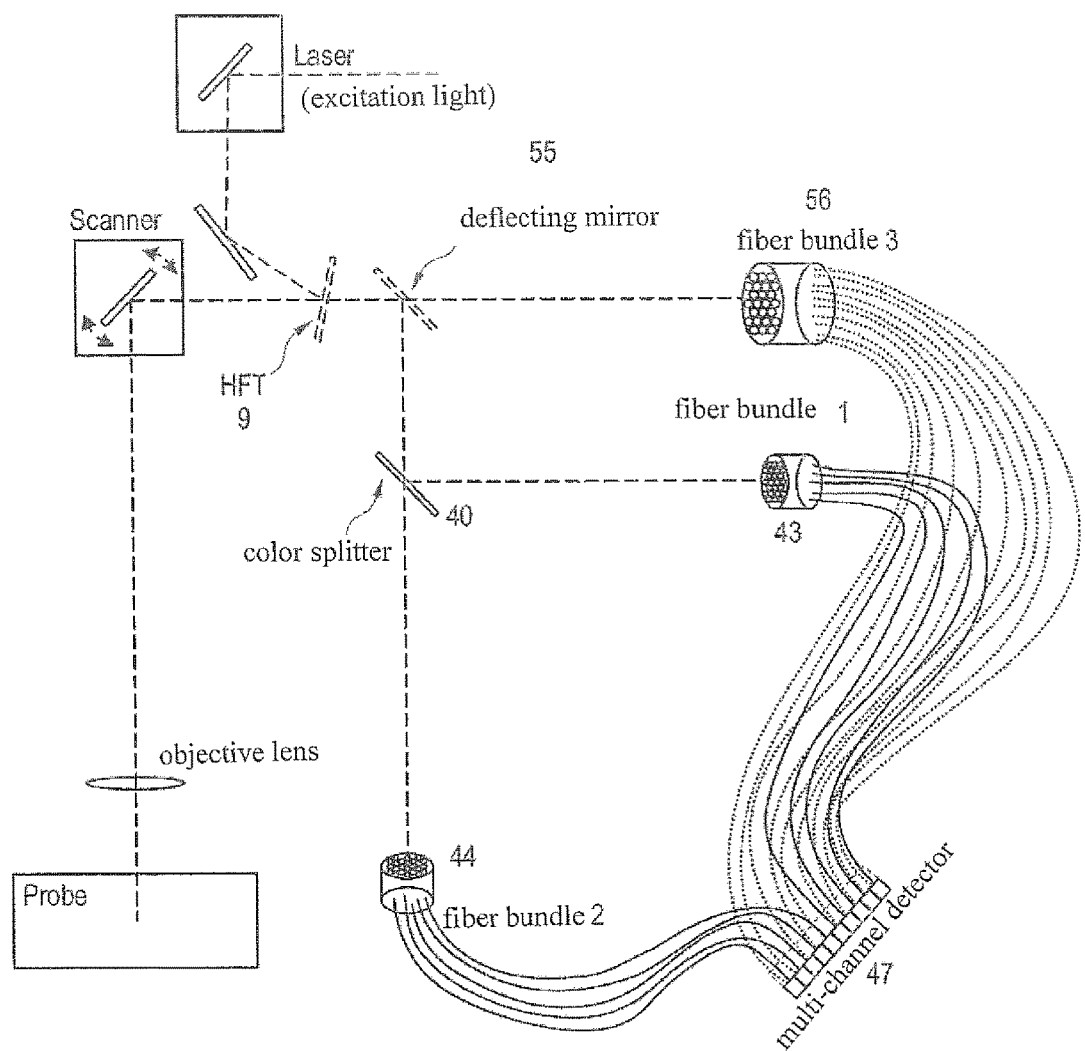
FIG. 15 shows a variant of a laser scanning microscope, with which data for two wavelength ranges can be obtained simultaneously with a single detection unit.

FIG. 15 shows a variant of a laser scanning microscope, with which data for two wavelength ranges can be obtained simultaneously with a single detection unit by means of the fiber bundles 43, 44; and with which, as an alternative, measurements can be conducted at one wavelength by way of a fiber bundle 56 (as a function of whether the moveable deflecting mirror 55 is or is not located in the beam path). All three fiber bundles allow a sub-Airy sampling of the signal. Then the signals are directed to a common multi-channel detector.

Figure 16:
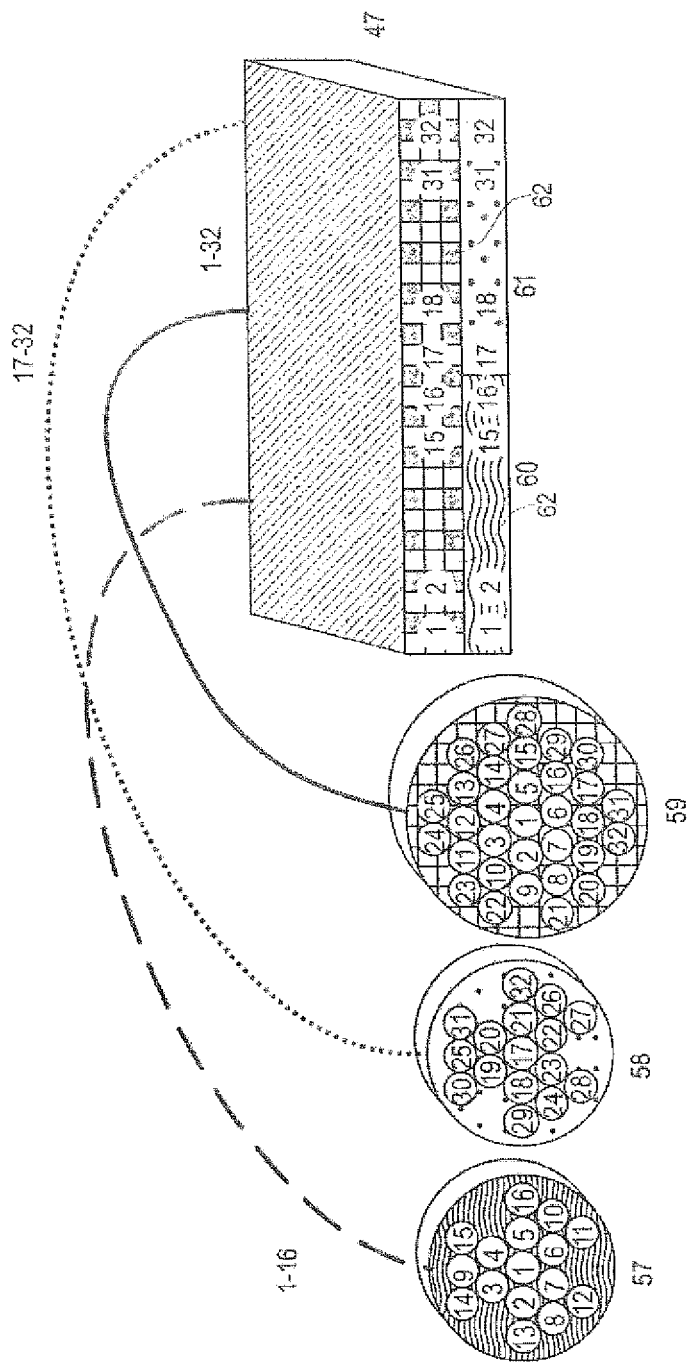
FIG. 16 shows, in addition to FIG. 15, the schematic of a fiber arrangement for simultaneously capturing images with a higher resolution for two wavelength ranges.

FIG. 16 shows, in addition to FIG. 15, the schematic of a fiber arrangement for simultaneously capturing images with a higher resolution for two wavelength ranges as well as an additional, alternative option for viewing the sample with finer sampling of the Airy disk or an improved signal-to-noise ratio (SNR), depending on the size of the Airy disk on the fiber input. In this case the fibers 1 to 16 in a first plug or fiber bundle 57 (43 in FIG. 15) (on the left in the figure) are assigned to a first wavelength range 60 on the detector 47. The fibers 17 to 32 in a second plug or fiber bundle 59 (44 in FIG. 15) are assigned to a second wavelength range. A third plug or fiber bundle 59 (56 in FIG. 15) with the fibers 1' to 32' is used as an alternative for viewing the sample at one wavelength over the entire detection area 62 of the detector 47.

All three plugs are located in a plane of the image. Then the fibers of all three plugs are combined (on the right in the figure), in order to guide the light of both wavelength ranges onto a common detector line with 32 channels. At the same time the combining is configured in such a way that the fibers 1 from 57 and 1' from 59 are assigned to a first detector channel; the fibers 2 and 2' are assigned to a second channel and so forth. This arrangement makes it possible to use the same detector to conduct, by choice, measurements at two wavelengths or measurements at one wavelength, but with finer sampling or better SNR.

Figure 17:
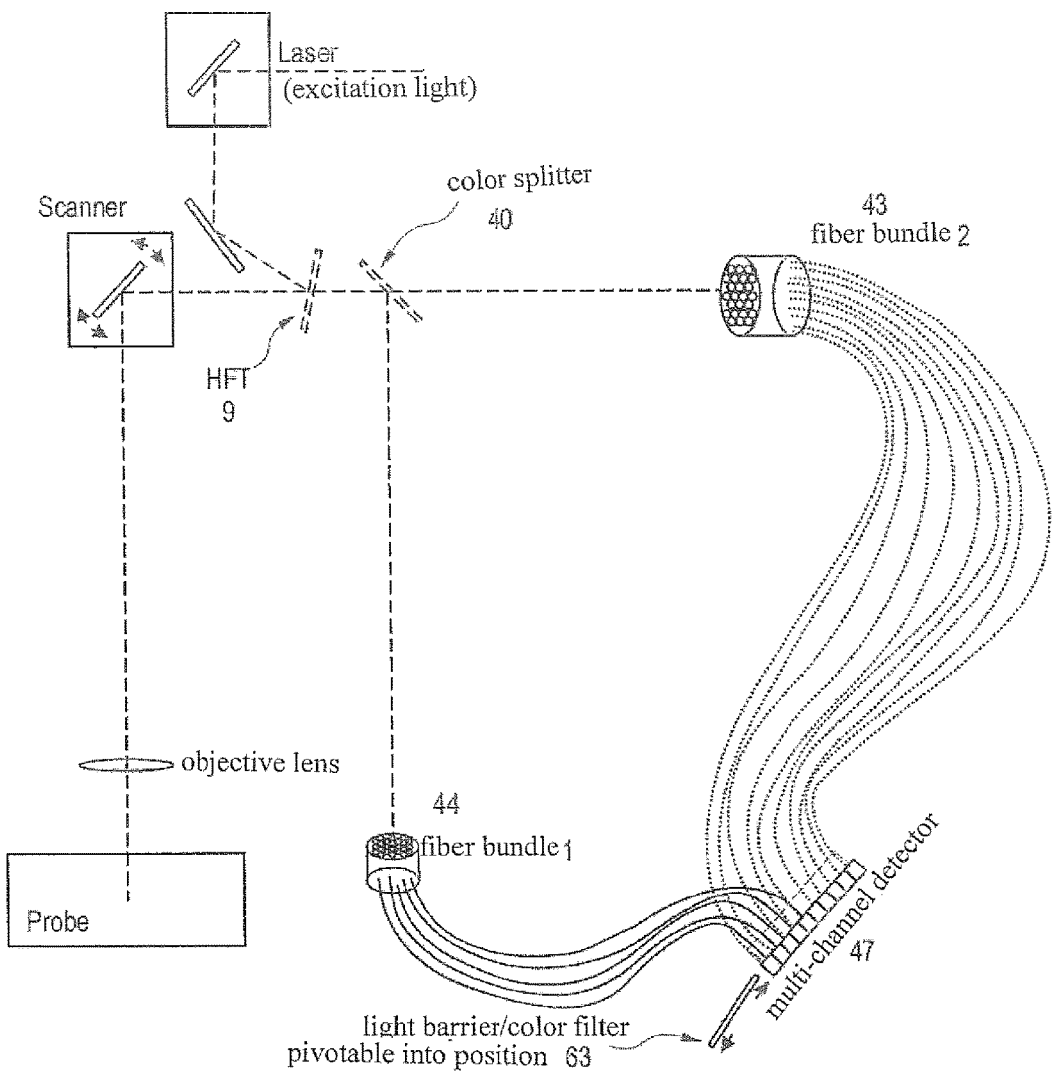
FIG. 17 shows an additional variant of a laser scanning microscope, with which data for two wavelength ranges can be obtained simultaneously with a single detection unit.

FIG. 17 shows an additional variant of a laser scanning microscope, with which data for two wavelength ranges can be obtained simultaneously with a single detection unit and with which, as an alternative, measurements can be conducted at one wavelength (as a function of whether the moveable color splitter is or is not located in the beam path). The said two fiber bundles 43, 44 allow a sub-Airy sampling of the signal. Then the signals are directed to a common multi-channel detector 47. If a detection is to be performed only for one wavelength, then a light barrier or a color filter 63, which can be pivoted into position or can be inserted, can prevent the light from the fiber bundle 1 from falling onto the detector. Inversely, the light barrier or the color filter 63 (with other transmission properties) can ensure that when viewing two wavelength ranges, the light from the fiber bundle 2 does not fall into the detector channels that are illuminated by the fiber bundle 1.

Figure 18:
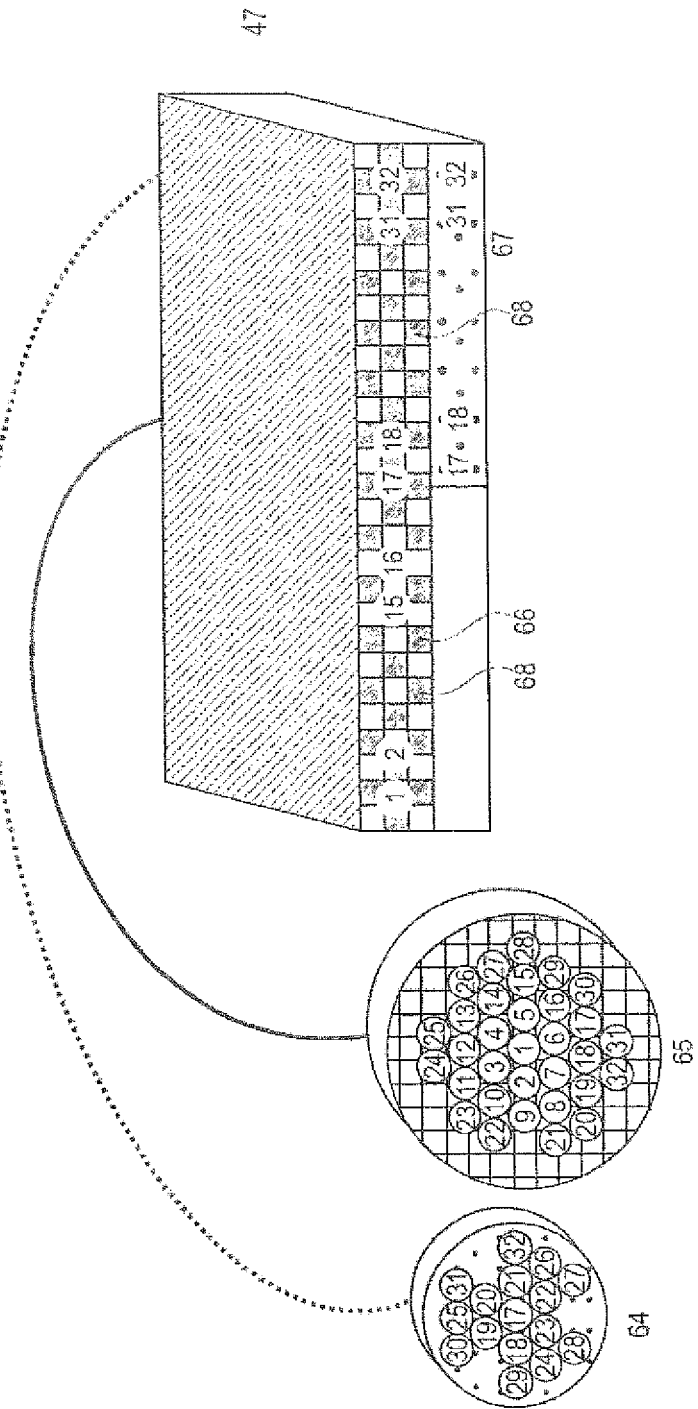
FIG. 18 shows a fiber arrangement for simultaneously capturing images with a higher resolution for two wavelength ranges as well as an additional alternative option for viewing the sample with finer sampling of the Airy disk.

FIG. 18 shows a fiber arrangement for simultaneously capturing images with a higher resolution for two wavelength ranges as well as an additional alternative option for viewing the sample with finer sampling of the Airy disk. In this case the fibers 17 to 32 in a first plug 64 (on the left in the figure) are assigned to a first wavelength range 67 on the detector 47. The fibers 1 to 16 in a second plug 65 are assigned to a second wavelength range 66 on the detector 47. As an alternative, the entire sample light can be directed only to the second plug by, for example, pivoting away the color splitter in FIG. 12. Then the fibers 1' to 32' (detector range 68) are used for acquiring the data at one wavelength. Both plugs are located in a plane of the image that is optically conjugate to the plane of the sample. Then the fibers of the two plugs are combined (on the right in the figure), in order to guide the light of the two wavelength ranges onto a common detector line having 32 channels. At the same time the combining is configured in such a way that the fibers 17 from 64 and 17' from 65 are assigned to the seventeenth detector channel; the fibers 18 and 18' are assigned to the eighteenth channel and so forth. The first sixteen detector channels receive signals only over the fibers 1' to 16'. This arrangement makes it possible to use the same detector to conduct, by choice, measurements at two wavelengths or measurements at one wavelength, but with finer sampling or better SNR.

FIG. 19 shows a schematic for a detection unit for detecting a high resolution image for two color channels. In this case the chromatic splitting is performed downstream of the fiber bundle 69.

Miniaturized color splitters 71 are mounted upstream of the detector matrix or detector line 70. Each color splitter acts in a transmissive manner on one detector element and a second by means of a double reflection at a splitter mirror and an additional mirror 72.

The signal is split into two spectral portions by means of the color splitter 71 and the mirror 72 and distributed between two detector elements of the multi-channel detector 70. In this example a high resolution image for a first wavelength range is generated, for example, by means of the odd detector channels; the even channels produce an image for a second wavelength range.

Variants:

A number of variants of the solutions, proposed in accordance with the invention, are described as follows:

a) If the sensitive area of the multi-channel detector that is used is sufficiently large, then it is possible to pre-assemble the fiber bundle in such a way that more than one fiber guides the light onto a detector element. This approach allows the user to use a detection channel, as described above, for simultaneous detection of two wavelength ranges or, as an alternative, to make all of the detector channels available for viewing the sample at one wavelength in a second detection channel (for example, with an even finer sampling of the Airy disk or an improved signal-to-noise ratio due to viewing more than one Airy). Such a combined fiber plug arrangement is shown in the figure.

b) As an alternative to the solution described above, 16 fibers are held together in one of the two fiber bundles, while the second bundle contains 32 fibers. This arrangement can be seen in the schematic drawing shown in FIG. 17. In this case, too, it is possible to implement the viewing of the sample in two wavelength ranges. For the first wavelength range the fibers 1' to 16' from the bundle having 32 fibers are used; for the second wavelength range the fibers 16 to 32 from the bundle having 16 fibers are used (see FIG. 17).

In order to ensure that the sample light from the fibers 17' to 32' does not fall on the detector, when the data are to be detected in two wavelength ranges, it is necessary in this case to insert either a light barrier between the fiber outputs 17' to 32' and the detector channels 17 to 32 into the beam path; or it is necessary to insert a color filter between the fiber ends 17, 17', . . . 32, 32' and the associated detector channels, wherein said color filter transmits only the light from the wavelength range of the fibers 17 to 32 and blocks the light from the fibers 17' to 32'.

c) A second alternative to the above described arrangements is based on the use of a single fiber bundle. The spectral splitting of the wavelength ranges is performed first between the fiber output and the detector. Here the beam is split according to the wavelength bands behind each fiber. Then the two wavelength bands are divided between two detector elements. This measure can be seen in the drawing shown in FIG. 19. It should be noted that in this case the adjustment of the fiber bundle can be performed for either only one wavelength or, as a compromise, between both wavelengths. As an alternative, the adjustable focusing optical system is configured in such a way that that it has a transverse chromatic aberration, which just about compensates for the enlargement of the Airy disk. In this case an additional focusing optical system is required to direct the light of the fibers to the detector channels.

d) In an additional alternative arrangement two fiber bundles are used. In this case the fiber plugs at the microscope are arranged side by side. A focusing optical system satisfies the objective of arranging two wavelength bands next to each other. This function is produced by means of an optical element with variable transverse chromatic aberration. Said optical element can be implemented, for example, by means of a wedge K that exhibits high dispersion and is disposed, for example, upstream of the focusing optical system 41 in FIG. 9, wherein said wedge can be moved perpendicular to the optical axis. This measure allows the light in a first wavelength range to be directed to the fibers 1 to 16, while the light of a second wavelength range reaches the fibers 17 to 32 in such a way that said light is spatially offset. The wavelength ranges can be selected by means of different wedge angles (interchangeable wedges or a "stepped" wedge that has varying wedge angles and is moved in the beam path).

As an alternative, the variable transverse chromatic aberration can be generated by means of a laterally moveable cemented component KG and is disposed, for example, downstream of the focusing optical system 41 in FIG. 9. The refractive indices and the Abbe dispersion numbers of said variable transverse chromatic aberration are selected in such a way that the two wavelength ranges are split spatially. By moving the wedge in the beam path it is possible to select the wavelength ranges. Such an element is known from the DE199514821A1.

In both cases additional mirrors, which are well-known in the field of the art, are necessary, optionally if desired, to direct the light of both spatially separated wavelength ranges to the two fiber bundles.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope for high resolution scanning microscopy of a sample comprising
a lighting device for illuminating a sample,
an imaging device for scanning at least one point spot or linear spot across the sample and for imaging the point spot or linear spot with detection light from said sample into a diffraction-limited, stationary still image in a plane of detection,
a detector device for detecting the still image in the plane of detection for different scan positions with a spatial resolution,
an evaluation device for evaluating a diffraction pattern of the still image for the scan positions from data of the detector device for generating an image of the sample, said image having a resolution that is increased beyond the diffraction limit,
said detector device having a detector array, which has pixels and is larger than the still image,
at least one non-imaging redistribution element, which is disposed upstream of the detector array and distributes the radiation from the plane of detection in a non-imaging manner among pixels of the detector array in such a way that a diffraction pattern of the still image resulting from the diffraction-limited imaging is spatially resolved, and
a color splitter arranged upstream of the detector array in such a way that different pixels of the detector array are exposed to different wavelengths of the same point of the still image.

2. The microscope according to claim 1, wherein said redistribution element comprises a bundle of multi-mode light conducting fibers, said bundle having an input which is arranged in the plane of detection, and an output, at which the light conducting fibers end at the pixels of the detector array in a geometrical arrangement which is different from that of the input.

3. The microscope according to claim 2, wherein said light conducting fibers run from the input to the output in such a way that the light conducting fibers that are adjacent to each other at the output are also adjacent to each other at the input in order to minimize a radiation intensity-dependent cross talk of adjacent pixels.

4. The microscope according to claim 1, wherein said redistribution element comprises a mirror having mirror elements with varying tilt, wherein said mirror deflects the radiation from the plane of detection onto the pixels of the detector array, said pixels of the detector array having a geometric arrangement that is different from that of the mirror elements.

5. The microscope according to claim 1, wherein said imaging device has a zoom optical system which is disposed upstream of the plane of detection in the imaging device in order to adjust the size of the still image to that of the detector device.

6. The microscope according to claim 5, wherein said lighting device and the imaging device share a scanning device so that the lighting device illuminates the sample with a diffraction-limited point spot or linear spot, which is coincident with the spot imaged by the imaging device, and said zoom optical system being arranged in such a way that it is also an integral part of the lighting device.

7. The microscope according to claim 1, wherein said detector array is a detector line.

8. A method for high resolution scanning microscopy of a sample comprising
    illuminating a sample,
    guiding at least one point spot or linear spot in a scanning manner over the sample and imaging
the at least one point spot or linear spot with detection light from said sample into a still image, said
spot being imaged in a diffraction limited manner into the still image, and the still image lying still in a plane of detection,
    detecting the still image for different scan positions with a spatial resolution,
    generating an image of the sample that has a resolution that is increased beyond the diffraction limit by evaluating for each scan position the diffraction pattern of the still image,
    providing a detector array that has pixels and is larger than the still image,
    providing at least one redistribution element for redistributing radiation of the still image from
the plane of detection in a non-imaging manner among the pixels of the detector array in such a way that a diffraction pattern of the still image resulting from the diffraction-limited imaging is spatially resolved, and
    splitting the detection light upstream of the detector array in such a way that different pixels of the detector array are exposed to different wavelengths of the same point of the still image.

9. The method according to claim 8, wherein said radiation of the still image is redistributed by means of a bundle composed of multi-mode light conducting fibers, said bundle having an input which is arranged in the plane of detection, and an output at which the light conducting fibers end at the pixels of the detector array in a geometrical arrangement which is different from that of the input.

10. The method according to claim 9, wherein said light conducting fibers are guided from the input to the output in such a way that the light conducting fibers which are adjacent to each other at the output are also adjacent to each other at the input in order to minimize a radiation intensity-dependent cross talk of adjacent pixels.

11. The method according to claim 8, wherein said bundle composed of light conducting fibers and the detector array are calibrated by exposing each optical fiber individually to radiation by detecting an interference signal in pixels, which are assigned to the light conducting fibers, which are adjacent to each other at the output, and by constructing a calibration matrix with which during microscopy of the sample a radiation intensity-dependent cross talk between adjacent pixels is corrected.

12. The method according to claim 8, wherein said radiation of the still image is redistributed by means of a mirror having mirror elements with varying tilt, said mirror directing the radiation from the plane of detection to the pixels of the detector array, said pixels of the detector array having a geometric arrangement that is different from that of the mirror elements.

13. The method according to claim 8, further comprising a detector line, used as the detector array.

14. The method according to claim 8, further comprising determining a direction of movement of the scanning of the point spot or the linear spot by evaluating the signals of the individual pixels of the detector array by means of cross correlation.

15. The method according to claim 8, further comprising detecting variations in the sample by determining and evaluating a temporal variation of the diffraction-limited still image at the point spot or the linear spot that is stationary in the sample.

16. A microscope according to claim 1, wherein
    at least two redistribution elements simultaneously exposed in parallel to the detection light, said detection light being at least partially different with respect to its spectral composition, and radiation from the at least two redistribution elements reaching pixels of a said detector array,
    said detection light from the redistribution elements reach adjacent regions of the detector array,
    at least one pixel of the detector array being exposed to the detection light from at least two redistribution elements,
    the pixels of the detector array being exposed to both detection light of a filtered spectral composition and also to detection light without spectral filtering,
    more pixels being exposed to the detection light for the detection without spectral filtering than for spectrally filtered detection,
    the pixels with the aforementioned exposure being arranged side by side and/or the pixels being exposed to the light from at least two redistribution elements,
    at least one color splitter for generating at least two partial beam paths with at least partially different spectral characteristics provided in the detection beam path,
    a switching element for releasing the exposure of a redistribution element to unfiltered detection light being provided in the detection beam path,
    the redistribution element being a fiber bundle having fiber ends that end at the pixel of the detector array,
    at least two fibers of different fiber bundles end on a pixel of the detector array,
    dichroic mirrors and deflecting elements being provided in the direction of light downstream of the light guides and upstream of the pixels of a detector array in such a way that adjacent detection pixels are exposed to wavelengths that are at least partially different.

17. A method according to claim 8, wherein
    providing at least two redistribution elements that are simultaneously exposed in parallel to the detection light, said detection light being at least partially different with respect to its spectral composition, and radiation from the at least two redistribution elements reaching pixels of a said detector array,
    said detection light from the redistribution elements reach adjacent regions of the detector array,
    exposing at least one pixel of the detector array to the detection light from at least two redistribution elements, exposing the pixels of the detector array to both the detection light of a filtered spectral composition and also to the detection light without spectral filtering, exposing more pixels to the detection light for the detection without spectral filtering than for spectrally filtered detection, arranging the pixels with the aforementioned exposure side by side and/or the pixels being exposed to the light from at least two redistribution elements, generating at least two partial beam paths with at least partially different spectral characteristics by at least one color splitter in the detection beam path, providing a switching element for releasing the exposure of a redistribution element to unfiltered detection light in the detection beam path, the redistribution element being a fiber bundle having fiber ends that end at the pixel of the detector array, at least two fibers of different fiber bundles end on a pixel of the detector array, providing dichroic mirrors and deflecting elements in the direction of light downstream of the light guides and upstream of the pixels of a detector array in such a way that adjacent detection pixels are exposed to wavelengths that are at least partially different.

18. The microscope according to claim 4, wherein said mirror element is a multifaceted mirror.

19. The microscope according to claim 4, wherein said mirror element is a DMD.

20. The microscope according to claim 4, wherein said mirror element is an adaptive mirror.

21. The microscope according to claim 7, wherein said detector line is an APD line.

22. The microscope according to claim 7, wherein said detector line is a PMT line.

23. The method according to claim 12, wherein said mirror element is a multifaceted mirror.

24. The microscope according to claim 12, wherein said mirror element is a DMD.

25. The microscope according to claim 12, wherein said mirror element is an adaptive mirror.

26. The microscope according to claim 13, wherein said detector line is an APD line.

27. The microscope according to claim 13, wherein said detector line is a PMT line.

* * * * *